(12) United States Patent
Isik et al.

(10) Patent No.: US 11,983,854 B2
(45) Date of Patent: May 14, 2024

(54) DENOISING IMAGES RENDERED USING MONTE CARLO RENDERINGS

(71) Applicant: Adobe Inc., San Jose, CA (US)

(72) Inventors: Mustafa Isik, Munich (DE); Michael Yanis Gharbi, San Francisco, CA (US); Matthew David Fisher, San Carlos, CA (US); Krishna Bhargava Mullia Lakshminarayana, San Jose, CA (US); Jonathan Eisenmann, San Francisco, CA (US); Federico Perazzi, San Francisco, CA (US)

(73) Assignee: Adobe Inc., San Jose, CA (US)

(*) Notice: Subject to any disclaimer, the term of this patent is extended or adjusted under 35 U.S.C. 154(b) by 544 days.

(21) Appl. No.: 17/093,852

(22) Filed: Nov. 10, 2020

(65) Prior Publication Data
US 2022/0148135 A1     May 12, 2022

(51) Int. Cl.
*G06T 5/00*    (2006.01)
*G06N 3/045*   (2023.01)
(Continued)

(52) U.S. Cl.
CPC ........... *G06T 5/70* (2024.01); *G06N 3/045* (2023.01); *G06N 20/00* (2019.01); *G06T 3/40* (2013.01); *G06V 10/56* (2022.01); *G06V 10/60* (2022.01)

(58) Field of Classification Search
CPC ........ G06T 15/205; G06T 2207/20084; G06T 2207/10024; G06T 5/002; G06T 7/73;
(Continued)

(56) References Cited

U.S. PATENT DOCUMENTS

| 2008/0107345 A1* | 5/2008 | Melikian | G06V 10/243 |
| | | | 382/209 |
| 2017/0372515 A1* | 12/2017 | Hauswiesner | G06T 7/12 |
| 2023/0004810 A1* | 1/2023 | Shibata | G06N 3/08 |

FOREIGN PATENT DOCUMENTS

EP    3678088 A1 *   7/2020   ........... G06F 17/153

OTHER PUBLICATIONS

"Nima Khademi Kalantari, Steve Bako, Pradeep Sen, A Machine Learning Approach for Filtering Monte Carlo Noise, 2015, I.3.7 Computer Graphics]: Three-Dimensional Graphics and Realism—Raytracing, University of California, Santa Barbara" (Year: 2015).*
(Continued)

*Primary Examiner* — Andrae S Allison
*Assistant Examiner* — Phuong Hau Cai
(74) *Attorney, Agent, or Firm* — FINCH & MALONEY PLLC

(57) ABSTRACT

A plurality of pixel-based sampling points are identified within an image, wherein sampling points of a pixel are distributed within the pixel. For individual sampling points of individual pixels, a corresponding radiance vector is estimated. A radiance vector includes one or more radiance values characterizing light received at a sampling point. A first machine learning module generates, for each pixel, a corresponding intermediate radiance feature vector, based on the radiance vectors associated with the sampling points within that pixel. A second machine learning module generates, for each pixel, a corresponding final radiance feature vector, based on an intermediate radiance feature vector for that pixel, and one or more other intermediate radiance feature vectors for one or more other pixels neighboring that pixel. One or more kernels are generated, based on the final radiance feature vectors, and applied to corresponding pixels of the image, to generate a lower noise image.

20 Claims, 12 Drawing Sheets

(51) Int. Cl.
  G06N 20/00 (2019.01)
  G06T 3/40 (2006.01)
  G06T 5/70 (2024.01)
  G06V 10/56 (2022.01)
  G06V 10/60 (2022.01)
(58) Field of Classification Search
  CPC . G06T 2207/20208; G06T 15/06; G06T 3/40; G06T 2207/20076; G06T 5/50; G06T 2207/20081; G06T 2207/20216; G06N 3/045; G06N 20/00; G06N 7/01; G06N 3/08; G06V 10/56; G06V 10/60
  See application file for complete search history.

(56) References Cited

OTHER PUBLICATIONS

"Bochang Moon Kaist, Nathan Carr Adobe, Sung-Eui Yoon Kaist, Adaptive Rendering Based on Weighted Local Regression, Apr. 2014 Categories and Subject Descriptors: I.3.7 [Computer Graphics]: Three Dimensional Graphics and Realism—Raytracing, ACM Trans. Graph 33, 5, Article 170, 14 pages" (Year: 2014).*

"Michaël Gharbi, Tzu-Mao Li, Miika Aittala, Jaakko Lehtinen, Frédo Durand, Sample-based Monte Carlo Denoising using a Kernel-Splatting Network, Jul. 2019, ACM Trans. Graph., vol. 38, No. 4, Article 125" (Year: 2019).*

"Ian C. Doidge • Mark W. Jones, Probabilistic illumination-aware filtering for Monte Carlo rendering, Springer-Verlag Berlin Heidelberg 2013, Vis Comput (2013) 29:707-716" (Year: 2013).*

"Jorge Schwarzhaupt, Henrik Wann Jensen, Wojciech Jarosz, Practical Hessian-Based Error Control for Irradiance Caching, Nov. 2012, ACM Trans. Graph. 31 6, Article 193 (Nov. 2012), 10 pages" (Year: 2012).*

"B. R. Hunt, Fellow, IEEE, and Olaf Kubler, Karhunen-Loeve Multispectral Image Restoration, Part I: Theory, IEEE Transactions on Acoustics, Speech, Jun. 1984, and Signal Processing, vol. ASSP-32, No. 3," (Year: 1984).*

"Holly E. Rushm, Gregory J. W, Energy Preserving Non-Linear Filters, 1994, Computer Graphics Proceedings, Annual Conference, ACM 1994 ISBN: 0-89791-667-0" (Year: 1994).*

"Xin Yang1, Dawei Wang2, Wenbo Hu, DEMC: A Deep Dual-Encoder Network for Denoising Monte Carlo Rendering, Sep. 2019, Journalof Computer Science and Technology 34(5): 1123-1135" (Year: 2019).*

"Youyi Zheng, Hongbo Fu, Oscar Kin-Chung Au, Bilateral Normal Filtering for Mesh Denoising, Oct. 2011, IEEE Transactions on Visualization and Computer Graphics, vol. 17, No. 10" (Year: 2011).*

"Julian Steil, Michael Xuelin Huang, Andreas Bulling, Fixation Detection for Head-Mounted Eye Tracking Based on Visual Similarity of Gaze Targets, Jun. 14-17, 2018, Association for Computing Machinery, ACM ISBN 978-1-4503-5706-7/18/06" (Year: 2018).*

"Elan Dubrofsky and Robert J. Woodham, Combining Line and Point Correspondences for Homography Estimation, Springer-Verlag Berlin Heidelberg 2008, ISHV 2008 Part II, LNCS 5359, pp. 202-213." (Year: 2008).*

"Gurprit Singh et al., Analysis of Sample Correlation for Monte Carlo Rendering, 2019, Eurographics 2019, vol. 38, No. 2, STAR—State of The Art Report" (Year: 2019).*

Anderson, T. W., "On the distribution of the two-sample cramer-von mises criterion", The Annals of Mathematical Statistics, pp. 1148-1159, 1962.

Bako, S. et al., "Kernel-predicting convolutional networks for denoising monte carlo renderings", ACM Transactions on Graphics, vol. 36, 2017, 14 pages.

Bitterli, Benedikt, "Rendering resources", 2016, retrieved from the Internet: https://benedikt-bitterli.me/resources/ [copy retrieved Nov. 4, 2020], 9 pages.

Dammertz H. et al., "Edge-avoiding a-trous wavelet transform for fast global illumination filtering" In Proceedings of the Conference on High Performance Graphics, pp. 67-75. Citeseer, 2010.

Eisemann Elmar and Fredo Durand, "Flash photography enhancement via intrinsic relighting", ACM transactions on graphics (TOG), vol. 23, pp. 673-678, 2004.

Gharbi M et aL., "Sample-based monte carlo denoising using a kernel-splatting network", ACM Transactions on Graphics, vol. 38, Jul. 2019, 12 pages.

Kajiya James, "The rendering equation", ACM, 1986, pp. 143-150.

Kalantari N.K. et al., "A machine learning approach for filtering monte carlo noise", ACM Transactions on Graphics, vol. 34, 2015, 12 pages.

Kingma D and Jimmy Lei Ba, "Adam: A method for stochastic optimization", arXiv preprint arXiv:1412.6980, 2014, 15 pages.

Munkberg J and J Hasselgren, "Neural denoising with layer embeddings", In Computer Graphics Forum, vol. 39, 2020, pp. 1-12.

Petschnigg G et al., "Digital photography with flash and no-flash image pairs", ACM transactions on graphics, vol. 2, 2004, pp. 664-672.

Ronneberger O et al., "U-Net: Convolutional networks for biomedical image segmentation", arXiv:1505.04597v1, May 18, 2015, 8 pages.

Rousselle F et al., "Robust denoising using feature and color information", Computer Graphics Forum, vol. 32, 2013, pp. 121-130.

Tomasi C and R Manduchi, "Bilateral filtering for gray and color images", Proceedings of the 1998 IEEE International Conference on Computer Vision, Bobmby, India, 1998, 8 pages.

Veach Eric, "Robust Monte Carlo methods for light transport simulation", Stanford University PHD thesis, 1997, vol. 1610, 432 pages.

Vogels T et al., "Denoising with kernel prediction and asymmetric loss functions", ACM Transactions on Graphics, vol. 37, Aug. 2018, 15 pages.

U.S. Appl. No. 16/686,978, filed Nov. 18, 2019. 34 pages.

* cited by examiner

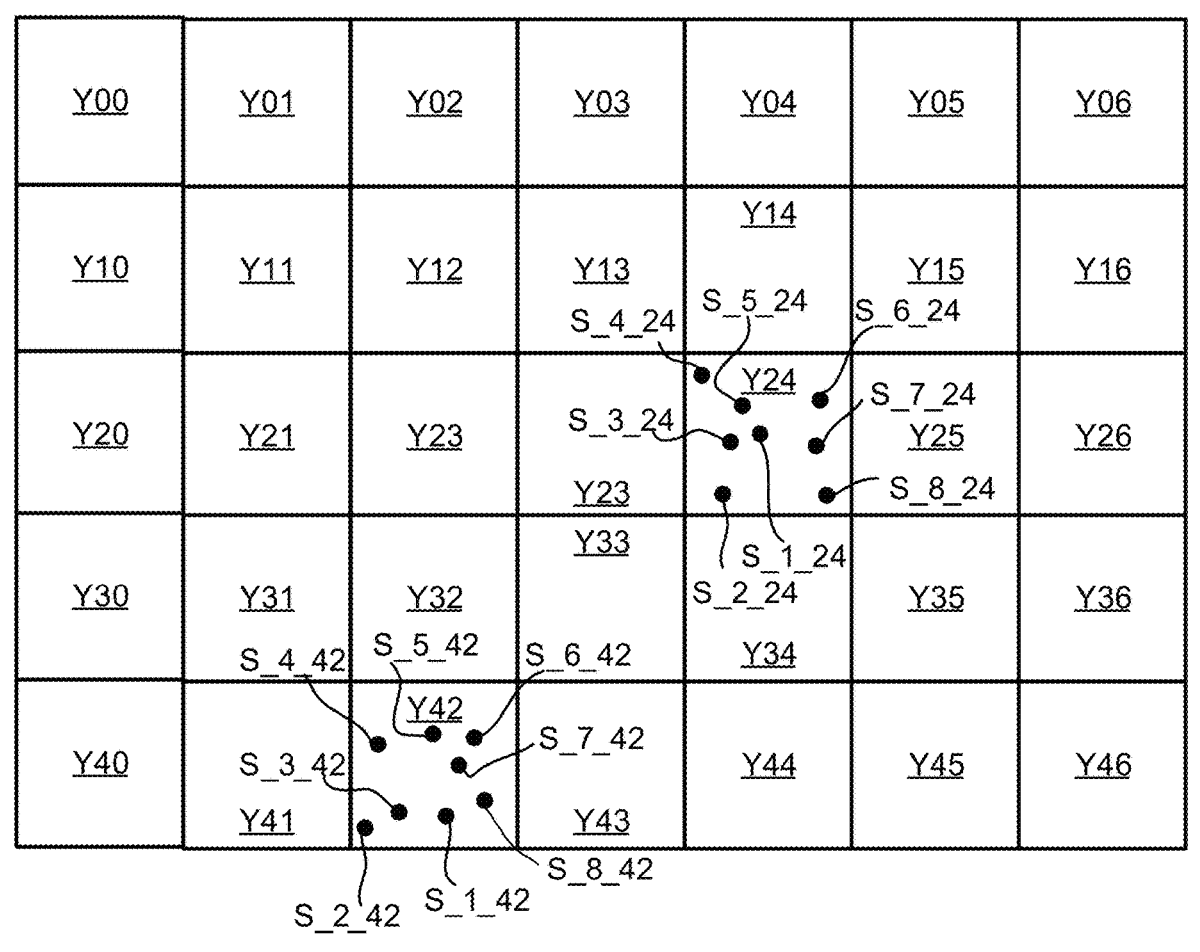

| Y00 | Y01 | Y02 | Y03 | Y04 | Y05 | Y06 |
| --- | --- | --- | --- | --- | --- | --- |
| Y10 | Y11 | Y12 | Y13 S_4_24 | Y14 S_5_24 | Y15 S_6_24 | Y16 |
| Y20 | Y21 | Y23 | S_3_24 Y23 | Y24 S_1_24 S_2_24 | S_7_24 Y25 S_8_24 | Y26 |
| Y30 | Y31 | Y32 S_5_42 | Y33 S_6_42 | Y34 | Y35 | Y36 |
| Y40 | S_4_42 S_3_42 Y41 S_2_42 | S_1_42 Y42 | S_7_42 Y43 S_8_42 | Y44 | Y45 | Y46 |

FIG. 3C

1. Initialize $\mathcal{L}^1 = L$, $k = 1$.  ⟵ 790

2. Compute weights $wk(i,j)$ in accordance with equations 7, 8, 9

3. Using equation 10, apply the kernels with stride of $2^{k-1}$ on $\mathcal{L}^k$ to get $L^{k+1}$ 4. If k<K (where K is 3, i.e., the number of stages in Fig. 7A):
   Increment k by one and go to step 2.

5. The final output is $\mathcal{L}^k$

DENOISING IMAGES RENDERED USING MONTE CARLO RENDERINGS

FIELD OF THE DISCLOSURE

This disclosure relates generally to denoising of images, and more specifically to techniques for denoising images that are rendered using Monte Carlo methods.

BACKGROUND

With advancement of computer graphics in the last few years, synthetic images can be generated using a computer. For example, an image processing application can be used to digitally generate a synthetic image from a synthetic or virtual scene, where the scene includes various digitally generated objects. Usually, such a synthetic image may not appear photorealistic, due to lack of lighting effects within the synthetic scene. A scene file describes the virtual scene, with information on geometry, lighting, shading, viewpoints and/or other attributes. The process of adding lighting effects to the synthetic scene, to make the resulting synthetic image look photorealistic, is often referred to as photorealistic rendering of the synthetic scene, or referred to herein for purposes of this disclosure as rendering the scene. In any case, the scene can be rendered by an image processing application, based on the scene file. Rendering techniques include methodologies that attempt to simulate the interaction of light with various objects within the image, referred to as light transport modelling. The depiction of light and its interaction with various scene elements within the image increases the realism of content depicted within the image. Existing techniques for such photorealistic rendering of synthetic scenes include, for example, the Monte Carlo methodology. However, the Monte Carlo methodology can generate noisy images, especially when the number of sampling points used for the Monte Carlo methodology is relatively low. Complicating this issue is that a relatively large number of sampling points causes a non-trivial computational burden. Such increased computational costs inhibit real-time processing.

SUMMARY

Techniques are disclosed for de-noising an image. For example, a method for de-noising a first image comprises identifying, within individual pixels of a plurality of pixels of the first image, a corresponding plurality of sampling points. For individual sampling points of individual pixels, a corresponding radiance vector is estimated. A radiance vector of a sampling point includes one or more radiance values characterizing light received at the sampling point. A first machine learning module generates, for individual pixels, a corresponding intermediate radiance feature vector, based on the radiance vectors associated with the corresponding plurality of sampling points within the corresponding pixel. A second machine learning module generates, for individual pixels, a corresponding final radiance feature vector. In more detail, a first final radiance feature vector for a first pixel is generated based at least in part on (a) an intermediate radiance feature vector for the first pixel and (b) one or more other intermediate radiance feature vectors for one or more other pixels neighboring the first pixel. One or more subsets of filter weights or kernels are generated, based at least in part on the final radiance feature vectors. In more detail, a kernel is a two-dimensional convolution matrix, and can be thought of as a mask or a filter comprising a relatively small matrix (e.g., small relative to the image on which it is applied). Each subset may include one or more kernels. The one or more subsets of kernels are applied to one or more corresponding pixels of the first image, to generate a second image. In some instances, the second image has less noise and is more photo-realistic than the first image.

In another example, a system is provided for rendering a photorealistic image from an original image comprising a plurality of pixels. The system includes one or more processors; and an image denoising sub-system executable by the one or more processors. In some examples, the sub-system is to generate, for each pixel of the plurality of pixels of the original image, a corresponding radiance feature vector and a corresponding auxiliary feature vector. The sub-system is to further generate at least a first subset of kernels and a second subset of kernels, based on the radiance feature vectors and the auxiliary feature vectors of the plurality of pixels. The sub-system is to convolute the first subset of kernels with the original image, to generate a first image. In some instances, the sub-system is to convolute the second subset of kernels with the first image, to generate a second image that is photorealistic relative to the original image.

In another example, provided is a computer program product including one or more non-transitory machine-readable mediums encoded with instructions that when executed by one or more processors cause a process to be carried out for decreasing noise within a digital image. In some examples, the process comprises identifying a first plurality of sampling points within a first pixel of a plurality of pixels including in a first image, and a second plurality of sampling points within a second pixel of the plurality of pixels. For each sampling point of the first and second plurality of sampling points, a corresponding radiance vector is estimated, where a radiance vector of a sampling point includes one or more radiance values associated with light received at the sampling point. The process further includes generating (i) a first intermediate radiance feature vector for the first pixel, based at least in part on the radiance vectors associated with each of the first plurality of sampling points, and (ii) a second intermediate radiance feature vector for the second pixel, based at least in part on the radiance vectors associated with each of the second plurality of sampling points. The process further includes generating a first final radiance feature vector for the first pixel and a second final radiance feature vector for the second pixel, based at least in part on the first and second intermediate radiance feature vectors. The process further includes generating one or more kernels, based at least in part on the first final radiance feature vector and the second final radiance feature vector, and applying the one or more kernels to one or more corresponding pixels of the first image, to generate a second image, wherein the second image has less noise than the first image. The second image may be perceived as more photo-realistic than the first image.

BRIEF DESCRIPTION OF THE DRAWINGS

FIG. 3C illustrates a plurality of neighboring pixels of a scene that is to be rendered, and example sampling points of some example pixels, in accordance with some embodiments of the present disclosure.

DETAILED DESCRIPTION

Figure 1:
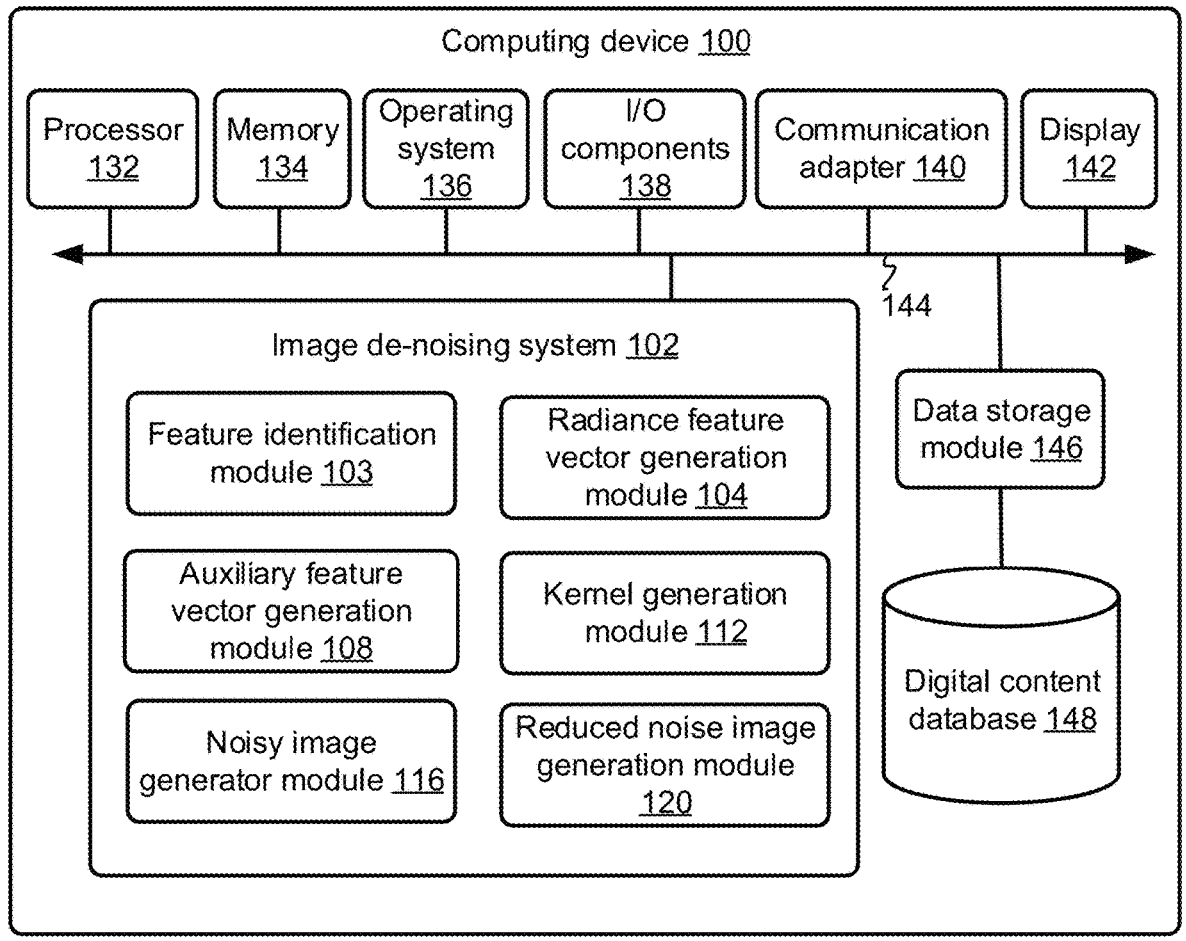
FIG. 1 is a block diagram schematically illustrating selected components of an example computing device configured to generate a noisy image using the Monte Carlo methodology (or otherwise access the noisy image), and de-noise or at least reduce the noise in the noisy image, in accordance with some embodiments of the present disclosure.

Techniques are disclosed for rendering photorealistic images. The techniques are particularly useful in the context of Monte Carlo rendering of a noisy image from a synthetic scene using relatively few sampling points, wherein the techniques can be applied to de-noise the noisy image. Because the initial noisy image is generated using relatively low number of sampling points, the computational burden and time consumption to execute the Monte Carlo methodology is relatively less. In any case, a scene file, which includes information describing various attributes of the synthetic scene, is used to generate radiance and auxiliary vectors. The de-noising techniques use deep learning to learn feature vectors for each pixel of the noisy image, based on the radiance and auxiliary vectors. Pairwise relationships (such as L2 distances) between the feature vectors are then computed, to decide how much radiance a pixel should contribute to its neighboring pixels. Specifically, L2 distances between pairs of feature vectors are used to generate weights for various kernels, which are used in a corresponding de-noising stage. For example, in a first de-noising stage, a first subset of kernels is convoluted with the noisy image, to generate a first intermediate image. In a second de-noising stage, a second subset of kernels is convoluted with the first intermediate image, to generate a second intermediate image. This process continues based on a given number of stages. The final de-noising stage outputs the final low-noise photorealistic image.

The photorealistic images generated using such techniques as provided herein are comparable in quality and realism with images that are generated using time and resource consuming Monte Carlo renderings with much higher sampling points. The techniques discussed herein are fast (e.g., as low sampling Monte Carlo methodology is initially employed to generate the noisy image), and can be implemented at real-time or near real-time, suitable for rendering at an interactive frame-rate. Numerous embodiments and variations will be appreciated in light of this disclosure.

General Overview

As discussed above, the Monte Carlo methodology is often used to render a synthetic scene, to generate a realistic image from the synthetic scene, using a scene file. For example, the Monte Carlo methodology aims to generate a photorealistic version of the scene, by attributing desired radiance or light levels to individual pixels of the synthetic scene. Monte Carlo comprises a computational technique that uses repeated random sampling to make numerical estimations of unknown information. The number of samples used during the Monte Carlo dictates the quality of the estimation. For example, as the sampling process is stochastic, results suffer from variance which manifests itself as noise, and for example, a number of sampling points has to be quadrupled to halve the error. So, a relatively large number of samples are required for convergence. Accordingly, when Monte Carlo methods are used for image rendering, lower sampling can generate a low-quality (e.g., noisy) rendering, and conversely, higher sampling can generate high-quality (e.g., relatively noise free) rendering. To generate a high-quality and truly photo-realistic image, the number of samples has to be relatively large, which increases computational burden and/or computation time of the Monte Carlo methodology. Even with today's high computation power, it may take relatively long time (e.g., measured in hours) to render complex scenes using Monte Carlo, to produce noise-free (or noise less a threshold) results.

Thus, techniques are provided herein to de-noise a noisy image rendered by a Monte Carlo methodology. Because the initial noisy image can be generated using a relatively low number of sampling points, the computational burden and time consumption to execute the Monte Carlo methodology are both relatively low. The de-noising techniques use deep learning to learn a feature vector from each sampling point in each of a plurality of pixels of the noisy image. Such de-noising techniques then use pairwise affinity of such deep features to compute distances (such as L2 distances) between feature vectors, to decide how much radiance a pixel should contribute to its neighboring pixels. This pairwise relationship between feature vectors results in rendering of low-noise photorealistic images. The photorealistic images generated using such techniques are comparable in quality and realism with images that are generated using time and resource consuming Monte Carlo renderings with much higher sampling points. The techniques discussed herein are relatively fast (e.g., as low sampling Monte Carlo methodology is initially employed to generate the noisy image), and can be implemented at an interactive frame-rate, as will be discussed in further detail in turn.

In further detail, and according to some example embodiments, a noisy image generator module of an image de-noising system generates a Monte Carlo rendering of a synthetic scene using a relatively smaller number of sampling points per pixel (SPP). Merely as an example, 8 SPP, 16 SPP, or 24 SPP can be used for the Monte Carlo rendering, although a higher number of sample points can be used if tolerated by the particulars of a given application. For example, the Monte Carlo methodology aims to generate a photorealistic version of the scene, by attributing desired radiance or light levels to individual pixels of the synthetic scene. As the Monte Carlo rendering uses a relatively lower number of SPP, the resultant image is relatively noisy and is far from being perceived as photorealistic.

During or subsequent to the Monte Carlo rendering, the image de-noising system identifies, within each pixel, a corresponding plurality of sampling points. The sampling points of a pixel can be randomly distributed within the pixel. Various examples discussed herein assume an 8 SPP scenario, however, another appropriate SPP may also be used in other examples, as will be appreciated.

A feature identification module of the image de-noising system identifies, for each sampling point $S_i$, one or more radiance features. For example, the radiance features refer to attributes or characteristics of incoming light radiance on the sampling point $S_i$. For instance, in some such example embodiments, the incoming light on the sampling point is categorized into different categories, such as (i) direct lighting and diffuse reflection, (ii) direct lighting and specular reflection, (iii) indirect lighting and diffuse reflection, and (iv) indirect lighting and specular reflection, and the radiance features are identified based on such categorization. The image de-noising system (also referred to simply as "system") then generates, for each sampling point of each pixel of the noisy image, a corresponding radiance vector $L_{si}$ (where $S_i$ is the index for the sampling point), as will be discussed in further detail herein.

The feature identification module of the image de-noising system also identifies, for each sampling point $S_i$, one or more auxiliary features. The auxiliary features of the sampling point $S_i$ include different features or attributes that uniquely define or characterize the sampling point $S_i$. The auxiliary features include intrinsic properties (such as roughness, emissivity, albedo) of the sampling point $S_i$, as well as properties of the sampling point $S_i$ relative to a position of the camera (such as distance or "depth" from the camera). The system then generates, for each sampling point of each pixel, a corresponding auxiliary vector. For example, an auxiliary vector $A_{si}$ is generated for the sampling point $S_i$, as will be discussed in further detail herein in turn.

Subsequently, a radiance feature vector generation module of the image de-noising system receives, for each sampling point, the corresponding radiance vectors of the corresponding sampling points. A machine learning module (such as a neural network module) of the radiance feature vector generation module generates, for example, for each pixel, a corresponding intermediate radiance feature vector. Thus, the machine learning module receives the radiance vectors per-sampling point, and generates the intermediate radiance feature vector per pixel. For example, the machine learning module is trained to identify how a plurality of radiance vectors corresponding to various sampling points of a specific pixel is to be processed and averaged, to generate the corresponding intermediate radiance feature vector for that specific pixel. Merely as an example, the machine learning module is a neural network trained to detect patterns in the radiance vectors, and determine a manner in which the radiance vectors are to be combined or averaged to form the intermediate radiance feature vectors, as will be discussed in detail in turn.

Subsequently, the radiance feature vector generation module of the image de-noising system generates, for each pixel, a corresponding final radiance feature vector and corresponding one or more scaling factors. For example, the radiance feature vector generation module includes another neural network module that receives the intermediate radiance feature vectors, and generates the final radiance feature vectors. In some such example embodiments, the neural network module is trained to cross-correlate radiance features of neighboring pixels, to generate the final radiance feature vectors. For example, the neural network module determines how radiance values associated with a pixel can contribute to a neighboring pixel. The neural network module spatially propagates radiance attributes of a first pixel to one or more neighboring pixels (e.g., if the first pixel and one or more neighboring pixels have some similar radiance attributes and/or are on a same or similar section of the image), and generates the final radiance feature vectors of the pixels accordingly, as will be discussed in further detail in turn.

In some embodiments, each final radiance feature vector has a number of sections that matches a number of de-noising stages. Various examples discussed herein assume three de-noising stages, and hence, each final radiance feature vector has three corresponding sections. For example, a final radiance feature vector F_Ri for an example pixel i has three sections F_Ri_1, F_Ri_2, and F_Ri_3. In some such embodiments, for an individual pixel i, three corresponding scaling factors $a_i^1$, $a_i^2$, and $a_i^3$ are also generated, which will be discussed herein in turn. Variations will be appreciated.

Furthermore, an auxiliary feature vector generation module of the image de-noising system receives, for each sampling point, the corresponding auxiliary vectors of the corresponding sampling points. A machine learning module (such as a neural network module) of the auxiliary feature vector generation module generates, for example, for a given pixel, a corresponding intermediate auxiliary feature vector. Thus, the machine learning module receives the auxiliary vectors per sampling point, and generates the intermediate auxiliary feature vector per pixel. For example, the machine learning module is trained to identify how a plurality of auxiliary vectors corresponding to various sampling points of a specific pixel is to be processed and averaged, to generate the corresponding intermediate auxiliary feature vector for that specific pixel. Merely as an example, the machine learning module is a neural network trained to detect patterns in the auxiliary vectors, and determine a manner in which the auxiliary vectors are to be combined or averaged to form the intermediate auxiliary feature vectors, as will be discussed in detail in turn.

Subsequently, the auxiliary feature vector generation module of the image de-noising system generates, for each pixel, a corresponding final auxiliary feature vector. For example, the auxiliary feature vector generation module includes another neural network module that receives the intermediate auxiliary feature vectors, and generates the final auxiliary feature vectors. In some examples, the neural network module is trained to cross-correlate auxiliary features of neighboring pixels, to generate the final auxiliary feature vectors. For example, the neural network module determines how auxiliary values associated with a pixel can contribute to a neighboring pixel. The neural network module spatially propagates auxiliary attributes of a first pixel to one or more neighboring pixels, e.g., if the first pixel and one or more neighboring pixels have some similar auxiliary attributes and/or are on a same or similar section of the image, and generates the final auxiliary feature vectors of the pixels accordingly, as will be discussed in further detail in turn.

Subsequently, a kernel generation module of the image de-noising system generates K subsets of kernels corresponding to K number of de-noising stages. Each subset may include one or more kernels. Various examples discussed herein have has three de-noising stages, and hence, three subsets of kernels are generated. Note, however, any number of de-noising stages can be used, depending on the given application, and as will be appreciated in light of this disclosure. As will be further appreciated in light of this disclosure, a kernel is a two-dimensional convolution matrix, and can be thought of as a mask or a filter comprising a relatively small matrix (e.g., small relative to the image on which it is applied). To this end, a kernel can be used to process images in various image processing applications. In an example embodiment, Each subset has kernels with stride of $2^{(k-1)}$, where k=1, . . . , K, as will be discussed herein below. Each kernel in the first subset of kernels is, merely as an example, a 3×3 matrix corresponding to a window of 3×3 pixels (although in other examples, a larger matrix size may be used, such as a 13×13 matrix). A central pixel in a specific kernel is a target pixel of that kernel, and that kernel is applied to the noisy image, to correct radiance value of that specific target pixel. Each kernel in the first subset has a stride set to $2^{(1-1)}=2^0=1$. Thus, each pixel that is 1-pixel apart from the target pixel is assigned a non-zero weight while generating the kernel. Each kernel in the second subset of kernels is a 5×5 matrix corresponding to a window of 5×5 pixels. Each kernel in the second subset has a stride set to $2^{(2-1)}=2^1=2$. Thus, each pixel that is 2-pixels apart from the target pixel is assigned a non-zero weight while generating the kernel. Other pixels within the kernel that are, for example, 1-pixel apart are assigned a zero weight. Each kernel in the third subset of kernels is a 9×9 matrix corresponding to a window of 9×9 pixels. Each kernel in the third subset has a stride set to $2^{(3-1)}=2^2=4$. Thus, each pixel that is 4-pixels apart from the target pixel is assigned a non-zero weight while generating the kernel. Other pixels within the kernel that are, for example, 2 or 3-pixels apart are assigned a zero weight.

Thus, each kernel has weights assigned to at least some pixels. For example, stride 1 kernels have 8 pixels neighboring the target pixel, and each of these 8 neighboring pixels are assigned corresponding non-zero weights. Stride 2 kernels have 24 pixels neighboring the target pixel, and 8 of the 20 neighboring pixels are assigned corresponding non-zero weights. Stride 4 kernels have 80 pixels neighboring the target pixel, and 8 of the 80 neighboring pixels are assigned corresponding non-zero weights.

Assume a kernel having pixel i as the target pixel, and assume that a neighboring pixel j in the kernel is assigned a corresponding non-zero weight. The weight assigned to the neighboring pixel j in the kernel is denoted as wk(i,j), where k is the subset count in which the kernel belongs. For example, if the kernel belongs to the first subset of kernels, the weight is w1(i,j); if the kernel belongs to the second subset of kernels, the weight is w2(i,j), and so on. In any such case, to generate the weight wk(i,j), a first L2 norm between (i) a $k^{th}$ section of the final radiance feature of pixel i (e.g., F_Ri_k) and (ii) a $k^{th}$ section of the final radiance feature of pixel j (e.g., F_Rj_k) is calculated. Furthermore, a second L2 norm between (i) a final auxiliary feature of pixel i and (ii) a final auxiliary feature of pixel j is also calculated. The weight wk(i,j) is based on the first L2 norm, the second L2 norm, and the scaling factor $a_j^k$. For example, a negative exponent of the first L2 norm and a negative exponent of the second L2 norm are considered when calculating the weight wk(i,j). Furthermore, the weight wk(i,j) is proportional to the scaling factor $a_j^k$. The scaling factor $a_j^k$ brings asymmetry between the weights wk(i,j) and wk(j,i). For example, if the scaling factors were absent, the weights wk(i,j) and wk(j,i) would be the same, as the above discussed first and second L2 norms are the same for both the weights. However, if the scaling factors $a_j^k$ and $a_i^k$ are different, the resulting weights wk(i,j) and wk(j,i) can also be different. This may ensure that an amount of radiance contribution of a first pixel to a neighboring second pixel is not same as an amount of radiance contribution of the second pixel to the first pixel. Accordingly, the scaling factors ensure that an outlier pixel can receive radiance contributions from neighboring pixels, while not substantially contributing radiance to the neighboring pixels. A pixel is an outlier pixel if, for example, the pixel is a source of light, e.g., the outlier pixel emits substantial radiance (e.g., is a light source) compared to one or more neighboring pixels.

Once the kernels of the various subsets are calculated, the kernels are applied to the noisy image (that was initially generated using the Monte Carlo methodology using relatively fewer sampling points), to generate the noise-free or noise-reduced output image. For example, kernels of the first subset are convoluted with the noisy image, to generate a first intermediate image. Kernels of the second subset are convoluted with the first intermediate image, to generate a second intermediate image. Finally, kernels of the third subset are convoluted with the second intermediate image, to generate the output image that is noise-free or at least noise-reduced, and more photorealistic than the initial noisy image. Thus, three de-noising stages are used, to generate the final photorealistic output image, according to such an example embodiment.

The techniques discussed herein have several advantages over conventional de-noising methodologies. For example, as discussed, in some embodiments, in order to have large enough spatial context for the kernels, instead of using a single stage with a large single fixed-sized kernel, multiple stages with multiple kernels having corresponding strides can be used as provided herein. Note that a kernel of the third subset has a size of 9×9 pixels, a kernel of the second subset has a size of 5×5 pixels, and a kernel of the first subset has a size of 3×3 pixels, according to an embodiment. However, in each of the kernels, only eight pixels neighboring the target pixel is weighted with non-zero values. Thus, although the spatial context of the kernel increases with the stage, the computation does not increase proportionally, the same number of weights are calculated per kernel, irrespective of the stage in which the kernel is used. Thus, in some embodiments, the denoising can be performed at a faster rate, such as at an interactive frame-rate. For example, the denoising is fast, as not all pixels within each kernel is weighted.

Furthermore, radiance and auxiliary feature attributes for multiple sampling points are intelligently averaged, to generate averages per pixels, by corresponding neural network modules. Thus, whenever attributes of new sampling points are available, the average is updated, to get a refined image. In an example, such progressive rendering of the image makes the de-nosing process fast and achieves interactive frame-rate for the de-noising process.

As discussed, the scaling factor contributes to asymmetry in radiance value contribution, while determining the weights wk(i,j). Accordingly, an outlier pixel can receive radiance contributions from neighboring pixels, while not substantially contributing radiance to the neighboring pixels.

Furthermore, the system utilizes deep learning to cast denoising as a supervised learning problem. Given the noisy input image, the neural networks predict feature vectors per pixel, by analyzing each pixel in its spatial proximity. When determining how much radiance a pixel should contribute to another pixel, the system explicitly calculates the distances between feature vectors of these pixels. Thus, the system makes it possible to use low capacity networks with lower computational cost, which leads to the de-noising operations discussed herein running interactive frame-rates. Thus, the system can generate substantially noise-free or low-noise images, even though the system uses only a fraction of parameters used by conventional de-noising systems.

System Architecture

FIG. 1 is a block diagram schematically illustrating selected components of an example computing device 100 (also referred to as device 100) configured to generate a noisy image using the Monte Carlo methodology, and de-noise or at least reduce the noise in the noisy image, in accordance with some embodiments of the present disclosure. As can be seen, the device 100 includes an image de-noising system 102 (also referred to as system 102), which allows the device 100 to access a noisy image that is generated in accordance with the Monte Carlo methodology, and to eliminate or at least reduce the noise in the noisy image.

As will be appreciated, the configuration of the device 100 may vary from one embodiment to the next. To this end, the discussion herein will focus more on aspects of the device 100 that are related to reducing noise in a noisy image, and less so on standard componentry and functionality typical of computing devices. The device 100 comprises, for example, a desktop computer, a laptop computer, a workstation, an enterprise class server computer, a handheld computer, a tablet computer, a smartphone, a set-top box, a game controller, and/or any other computing device that can reduce noise in a digital image.

In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, data storage module 146, and the image de-noising system 102. A digital content database 148 (e.g., that comprises a non-transitory computer memory) stores noisy images and/or noise-free (or noise-reduced) images, and is coupled to the data storage module 146. A bus and/or interconnect 144 is also provided to allow for inter- and intra-device communications using, for example, communication adaptor 140. In some embodiments, the device 100 includes a display screen 142 (referred to simply as display 142), although in some other embodiments the display 142 can be external to and communicatively coupled to the device 100. Note that in an example, components like the operating system 136 and the image de-noising system 102 can be software modules that are stored in memory 134 and executable by the processor 132. In an example, at least sections of the image de-noising system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually take place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also includes one or more I/O components 138, such as one or more of a tactile keyboard, the display 142, a mouse, a touch sensitive or a touch-screen display (e.g., the display 142), a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

Also illustrated in FIG. 1 is the image de-noising system 102 implemented on the device 100. In an example embodiment, the system 102 includes a feature identification module 103, a radiance feature vector generation module 104, an auxiliary feature vector generation module 108, a kernel generation module 112, a noisy image generator module 116, and a reduced noise image generation module 120, each of which will be discussed in detail in turn. In an example, the components of the system 102 are in communication with one another or other components of the device 102 using the bus and/or interconnect 144, as will be discussed in further detail in turn. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the image de-noising system 102 may be implemented in any application that allows reducing noise in images that are generated and/or rendered using the Monte Carlo methodology.

Figure 2:
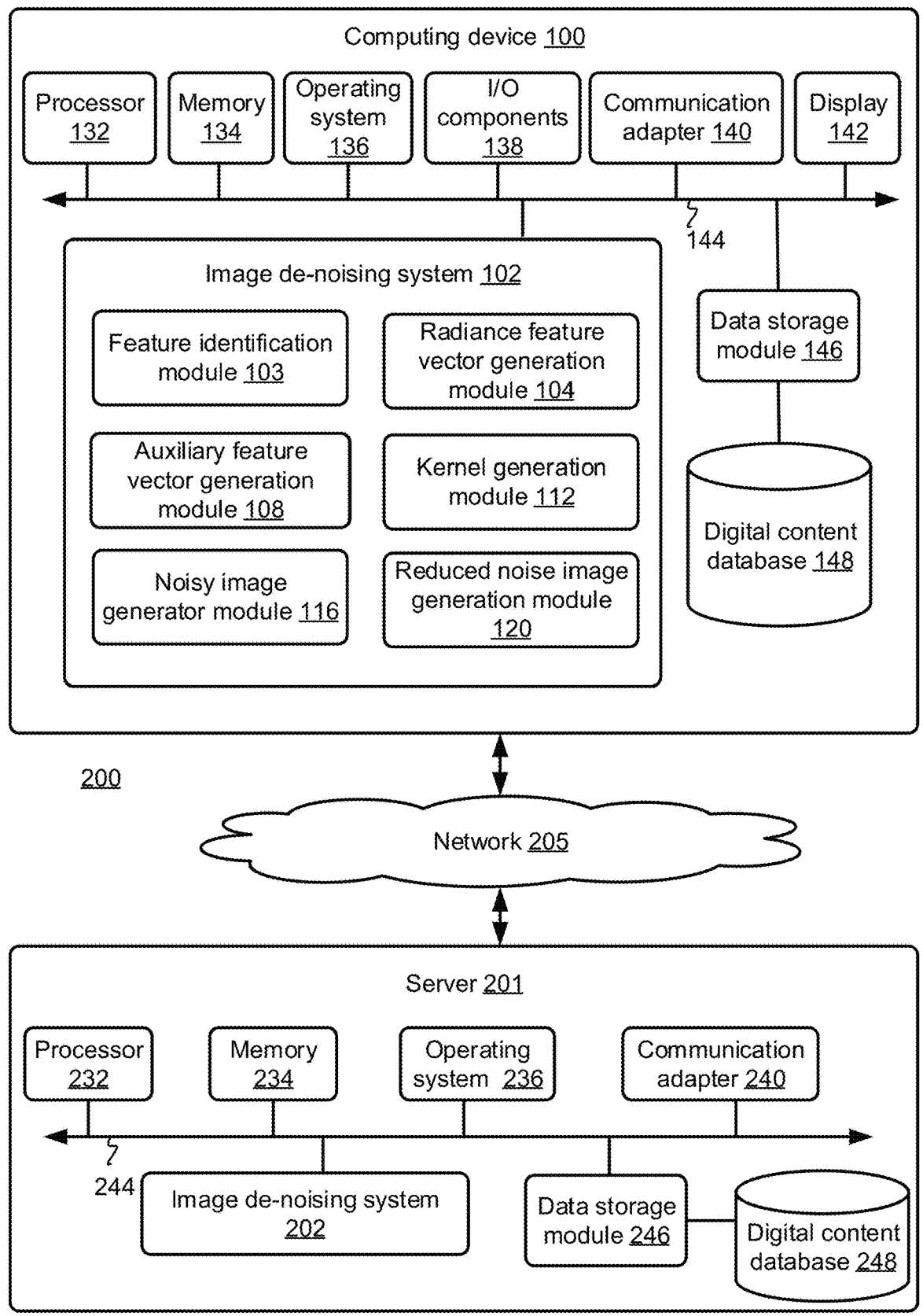
FIG. 2 is a block diagram schematically illustrating selected components of an example system comprising the computing device of FIG. 1 communicating with server device(s), where the combination of the computing device and the server device(s) are configured to generate a noisy image using the Monte Carlo methodology (or otherwise access the noisy image), and de-noise or at least reduce the noise in the noisy image, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to generate a noisy image using the Monte Carlo methodology (or otherwise access the noisy image), and de-noise or at least reduce the noise in the noisy image, in accordance with some embodiments of the present disclosure. In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide noise reduction services for digital images, as variously described herein. In some embodiments, the server 201 comprises an image de-noising system 202 providing such services, as variously described herein. Although one server implementation of the image de-noising system is illustrated in FIG. 2, it will be appreciated that, in general, tens, hundreds, thousands, or more such servers can be used to manage an even larger number of image de-noising functions.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, an image de-noising system 202 (also referred to as system 202), data storage module 246, and a communication adaptor 240. A digital content database 248 (e.g., that comprises a non-transitory computer memory) comprises noisy images and reduced noise images, and is coupled to the data storage module 246. A bus and/or interconnect 244 is also provided to allow for inter- and intra-device communications using, for example, communication adaptor 240 and/or network 205. Note that components like the operating system 236 and image de-noising system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including digital contents and/or codes associated with such digital contents. As shown, the server 201 includes the image de-noising system 202 that communicates with the system 102 on the client device 100. In an example, the image de-noising features discussed with respect to FIG. 1 can be implemented in FIG. 2 exclusively by the image de-noising system 102, exclusively by the image de-noising system 202, and/or may be shared between the image de-noising systems 102 and 202. Thus, in an example, none, some, or all image de-noising features are implemented by the image de-noising system 202.

For example, when located in the server 201, the image de-noising system 202 comprises an application running on the server 201 or a portion of a software application that can be downloaded to the device 100. For instance, the system 102 can include a web hosting application allowing the device 100 to interact with content from the image de-noising system 202 hosted on the server 201. In this manner, the server 201 reduces noise level of a digital image. Thus, the location of some functional modules in the system 202 may vary from one embodiment to the next. For instance, while the kernel generation module 112 is shown on the client side in this example case, it may be on the server side (e.g., within the system 202) in other embodiments. Any number of client-server configurations will be apparent in light of this disclosure. In still other embodiments, the techniques may be implemented entirely on a user computer, e.g., simply as stand-alone image modification application. Similarly, while the digital content database 148 is shown on the client side in this example case, it may be on the server side in other embodiments, such as a cloud-based image database. Thus, the database of the digital content and/or codes can be local or remote to the device 100, so long as it is accessible by the modules implemented by the system 102 or implemented by the system 202.

Example Operation

Figure 3A:
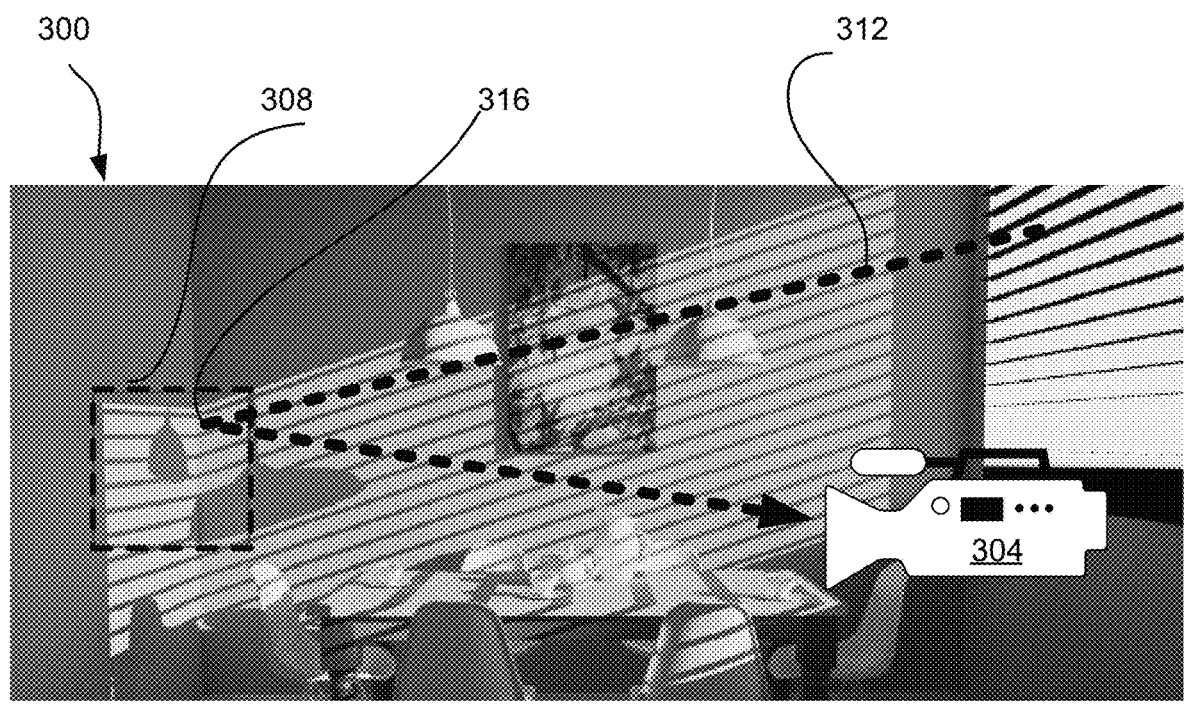
FIG. 3A illustrates an example scene, from which an image is to be generated and de-noised by the techniques discussed herein, in accordance with some embodiments of the present disclosure.

FIG. 3A illustrates an example scene, from which an image is to be generated and de-noised by the techniques discussed herein, in accordance with some embodiments of the present disclosure. The example scene illustrates a room next to a window, where the room includes a table, chairs, and two lamps. A shadow of the lamp is incident on walls of the room. Also illustrated is an example location of a camera 304 that is to capture the scene 300. It may be noted that in some examples, the scene 300 is generated synthetically. Furthermore, the camera, in some such examples, is a virtual camera. If a location of the virtual camera changes, the perspective of the scene 300 will also change.

The scene 300 is initially synthetically generated, without any lighting or shadows. Such a scene does not look realistic. To make the scene 300 look more photo-realistic, the scene 300 is rendered using an appropriate digital image rendering methodology, such as the Monte Carlo methodology.

An image generated from the scene 300, e.g., which is generated by the Monte Carlo method using a relatively large number of sampling points, may be a ground truth image. Thus, the scene 300 is relatively noise free and has a relatively high resolution. Illustrated within the scene is a rectangular section 308, which will be discussed herein later with respect to FIG. 3B.

Also illustrated is a path 312 of an example light ray entering the scene 300, getting reflected from an example sampling point 316 (which happens to be a wall) of the scene 300, and reaching the camera. During photorealistic rendering of the scene 300 (e.g., using Monte Carlo methodology), attributes (also referred to as "auxiliary features") of the sampling point 316 are taken into account. For example, if the sampling point 316 is a shiny object such as a glass or a mirror, a ray of incident light would be reflected from the sampling point 316 in a specific direction, e.g., specular reflection would occur, and the sampling point 316 would be rendered in a specific manner. On the other hand, if the sampling point 316 is a dull object such as a wall, the light would be reflected more uniformly in many (e.g., all) different directions, e.g., diffuse reflection would occur, and the sampling point 316 would be rendered in an entirely different manner. Thus, examples of such attributes or auxiliary features include surface characteristics of the sampling point 316, a distance of the sampling point 316 from the camera, as well as several other auxiliary features, as will be discussed in further detail in turn. Furthermore, rendering of the sampling point 316 is also based on an amount and/or type of light input from various directions on the sampling point 316. For example, the rendering of the sampling point 316 is also based on, for example, whether the sampling point receives direct illumination, indirect illumination, diffuse illumination, specular illumination, and so on, which is collectively referred to as radiance features at the sampling point 316. Thus, rendering of the sampling point 316 is based on auxiliary features of the sampling point 316, as well as radiance features of the sampling point 316, as will be discussed in further detail in turn.

Figure 3B:
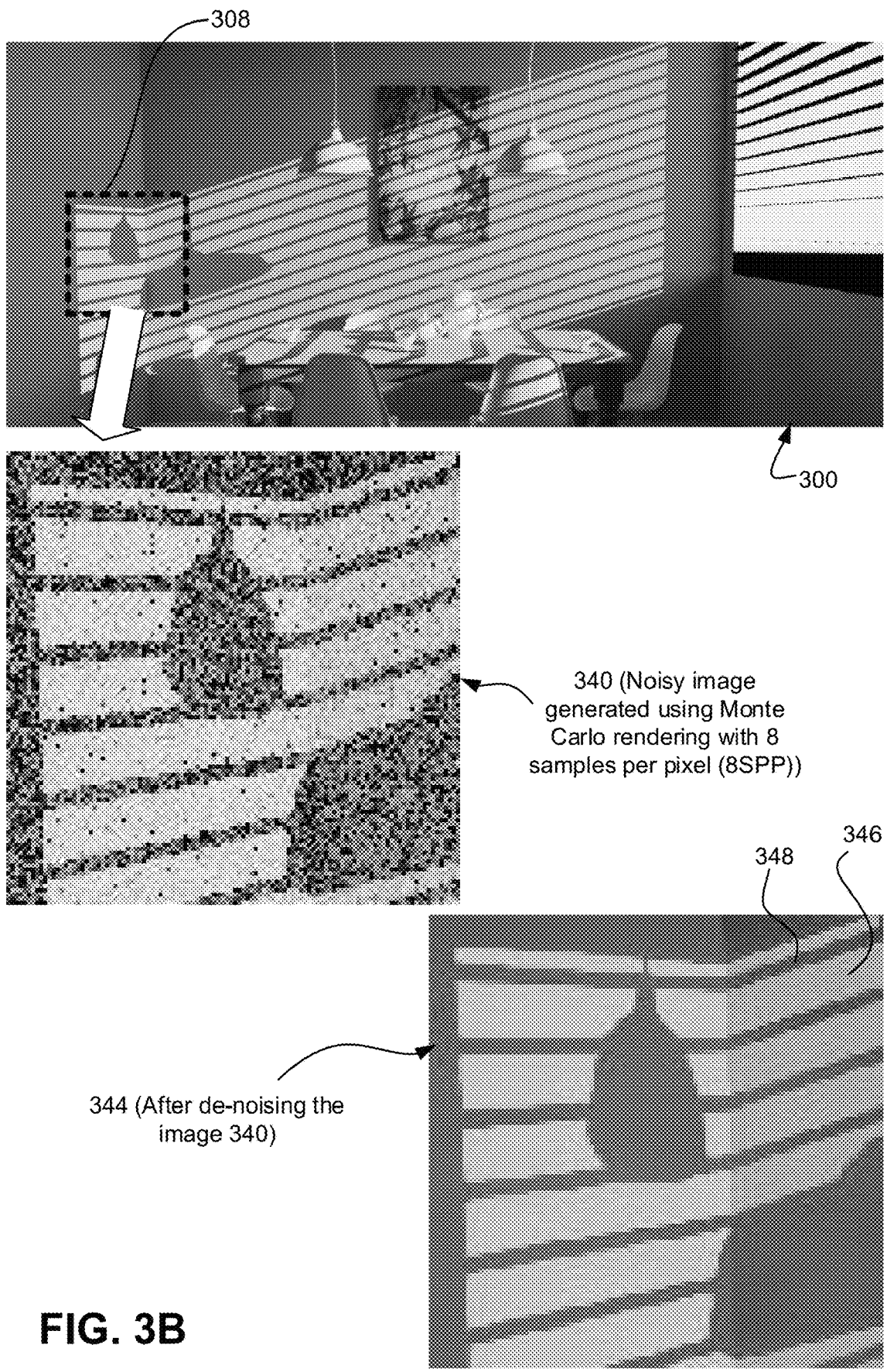
FIG. 3B illustrates a scene, a relatively noisy image generated for the scene using Monte Carlo rendering with 8 sampling points per pixel (8 SPP), and a relatively noise-free image generated by de-noising the noisy image, in accordance with some embodiments of the present disclosure.

FIG. 3B illustrates the scene 300 of FIG. 3A, a relatively noisy image 340 rendered for the scene using Monte Carlo rendering with 8 sampling points per pixel (8 SPP), and relatively noise-free image 344 generated by de-noising the image 340, in accordance with some embodiments of the present disclosure. For example, as discussed with respect to FIG. 3A, the scene 300 of FIGS. 3A-3B is a ground truth scene, e.g., which is rendered by the Monte Carlo methodology using a relatively large number of sampling points.

FIG. 3B also illustrates the image 340, which represents the rectangular section 308 of the scene 300. The image 340 is a noisy image rendered by the Monte Carlo methodology, using, for example, a relatively small number of sampling points, such as 8 SPP, as will be discussed.

FIG. 3B also illustrates the image 344, which represents a de-noised version of the image 340, as will be discussed in further detail herein. For example, the noise in the image 340 is eliminated or reduced, to generate the image 344. Generation of the image 344 from the image 340 will be discussed in great detail in turn.

FIG. 3C illustrates a plurality of neighboring pixels of a scene that is to be rendered, and example sampling points of two example pixels, in accordance with some embodiments of the present disclosure. For example, pixels Y00, Y01, . . . , Y46 are illustrated, arranged in rows and columns, such as in a matrix form. As an example, the pixel Y24 has immediate adjacent pixels Y13, Y14, Y15, Y23, Y25, Y33, Y34, and Y35. Also illustrated are sampling points S_1_24, S_2_24, . . . , S_8_24 within the example pixel Y24. Further illustrated are sampling points S_1_42, S_2_42, . . . , S_8_42 within another example pixel Y42.

Thus, 8 SPP or 8 sampling points per pixel is illustrated in FIG. 3C, although individual pixel can have any different number of sampling points therein. Although the sampling points are illustrated for example pixels Y24 and Y42, other pixels also include such sampling points, albeit not illustrated in the figure for purposes of illustrative clarity. The sampling points of a pixel are located randomly within the pixel. For example, sampling points S_1_24, S_2_24, . . . , S_8_24 are distributed randomly within the pixel Y24, and sampling points S_1_42, S_2_42, . . . , S_8_42 are distributed randomly within the pixel Y42.

The below equation 1 is a rendering equation that quantifies a distribution of light energy in a scene at any given sampling point in space, and forms the foundation of modern photorealistic image rendering:

$$L(x,\omega_0)=L_e(x,\omega_0)+\int_{\Omega+}f(x,\omega_i,\omega_0)\cdot L(x,\omega_i)\cdot(n\cdot\omega_i)d\omega_i \quad \text{Equation 1}$$

In equation 1, $L(x, \omega_0)$ is an outgoing radiance at sampling point x in an output direction $\omega_0$. The term $L_e$ represents emittance of radiance at the sampling point x in the output direction $\omega_0$. If the sampling point x is a light source that emits light or radiance, the term $L_e$ will have non-zero value. The integral term is the reflected radiance at the sampling point x in the output direction $\omega_0$, e.g., represents light reflected from the sampling point x in the output direction $\omega_0$. Thus, the total outgoing radiance $L(x, \omega_0)$ at the sampling point x in the output direction $\omega_0$ is a sum of emitted radiance and reflected radiance at the sampling point x.

As seen in equation 1, the reflected radiance is computed by integration over all possible input directions (e.g., integrated in all input directions represented symbolically by $\Omega+$). The term $f(x, \omega_i, \omega_0)$ is the Bidirectional Reflectance Distribution Function (BRDF) which defines what fraction of light energy coming from input direction $\omega_i$ is reflected into output direction $\omega_0$ at the sampling point x. The BRDF is a function of surface attributes, referred to herein as auxiliary features, such as emissivity property, reflective property, roughness property, albedo property, and/or other properties of the sampling point x. The term $L(x, \omega_i)$ is the radiance value of incident light from the input direction $\omega_i$, and the integration is performed across all possible direction of $\omega_i$, represented by $\Omega+$. The term $(n\cdot\omega_1)$ is a cosine factor that models the reduction in light energy due to light spreading into larger areas at grazing angles. Here, n is a direction normal or perpendicular to the surface at the sampling point x.

Ideally, equation 1 can be used to render a synthetic image, to make the image look more photo-realistic. However, a prominent challenge in solving the rendering equation 1 is that the solution requires the computation of a recursive integral. For example, as the integrand of the integral of equation 1 is high dimensional and discontinuous most of the time, using numerical integration methods or closed-form integration are generally intractable or difficult. Accordingly, often times, the Monte Carlo methodology is used, along with ray tracing, to solve equation 1. Ray tracing involves tracing rays of light from a light source, after being reflected by one or more sampling points, and reaching a camera, such as the path of light 312 illustrated in FIG. 3A. In path tracing, this path is reversed, such that light received by the camera can be traced back to the source of light, including possible reflections at different sampling points.

In some examples, the Monte Carlo methodology randomly samples the integrand of equation 1. A Monte Carlo estimator to compute equation 1 for individual pixel i can be represented as follows:

$$L_i = \frac{1}{N} \sum_{j=1}^{N} \frac{F(X_j)}{p(X_j)} \qquad \text{Equation 2}$$

In equation 2, N is a number of sampling points per pixel. For example, the image 340 is generated using 8 sampling points per pixel or 8 SPP, as also illustrated in FIG. 3B. Thus, in this case, N=8. The ground truth scene 300 of FIGS. 3A, 3B is generated using a larger number of SPP, such as 4096 SPP, and can be used as ground truth, e.g., to train various machine learning modules discussed herein.

In equation 2, $L_i$ is the final radiance output per pixel, F(x) represents the integrand of the rendering equation 1, $X_j$ is a random variable drawn from probability density function p(x), and p(Xj) is the probability of choosing the random variable $X_j$. Domain of $X_j$ can be the upper hemisphere of directions Ω+, but it can also be the set of all surface points depending on the different parameterization of the rendering equation. For example, referring to FIG. 3C where the pixel Y24 is sampled with 8 sampling points, the factor $F(X1)/p(X1)$ is computed for the sampling point S_1_24, the factor $F(X_2)/p(X_2)$ is computed for the sampling point S_2_24, and so on. Subsequently, these factors are summed and divided by 8, to provide an average of the samples, in accordance with equation 2, to generate final radiance output $L_{Y24}$ for the pixel Y24. The Ω+ is a set representing a large number that approaches infinite dimensions, which makes solving equation 1 difficult using limited computation power. In contrast, the number of sampling points N in equation 2 is a finite number, thereby allowing for computation of equation 2.

Thus, equation 2 can be used to compute equation 1 as follows:

$$L(x,\omega_0) = L_e(x,\omega_0) + L_i(x,\omega_0) \qquad \text{Equation 1a}$$

where $L_i(x, \omega_0)$ of equation 1a is calculated using the Monte Carlo methodology represented by equation 2.

The sample size N of equation 2 is indicative of a quality or amount of noise within an image rendered in accordance with equations 2 and 1a. For example, the ground truth image 300 of FIGS. 3A and 3B can be generated using a relatively high value (such as in hundreds, or thousands) of N. However, solving equation 2 for every pixel of the scene, with such as high value of N, is computationally intensive and time consuming. In contrast, the image 340 of FIG. 3B is generated with a relatively small value (such as 8) of N in equation 2.

As will be discussed herein in further detail in turn, equations 2 and 1a are used to render noisy images, e.g., by using relatively low value of the sample size N. For example, 8 SPP is used for equation 2, along with Monte Carlo methodology, to render a noisy image. Subsequently, various techniques discussed herein are used to reduce the noise in the noisy image and generate a noise-free (or reduced-noise) image, such as the section of the image 344 illustrated in FIG. 3B.

In the context of denoising images, a "sample" is represented by $$\frac{F(X_j)}{p(X_j)}$$

from equation 2. Each sampling point (such as the sampling points S_1_24, S_2_24, and so on, illustrated in FIG. 3C) has a corresponding sample represented by the above. Each sampling point is associated with corresponding plurality of radiance features and corresponding plurality of auxiliary features. For example, a sampling point $S_i$ is associated with (i) a corresponding radiance vector $L_{si}$ comprising a plurality of radiance features, and (ii) a corresponding auxiliary vector $A_{si}$ comprising a plurality of auxiliary features.

For example, the radiance vector $L_{si}$ comprises radiance features for the sampling point $S_i$, where the radiance features refer to attributes or characteristics of incoming light radiant on the sampling point $S_i$. In some examples, the incoming light radiance on the sampling point is categorized into different categories, such as (i) direct lighting and diffuse reflection, (ii) direct lighting and specular reflection, (iii) indirect lighting and diffuse reflection, and (iv) indirect lighting and specular reflection. The categories are generated by defining cartesian product between (direct lighting, indirect lighting) and (diffuse reflection, specular reflection), which results in the above discussed example categories.

The direct illumination component of the radiance vector $L_{si}$ for the sampling point $S_i$ comprises light that directly comes from a light source and illuminates the sampling point $S_i$. In contrast, indirect illumination of the radiance features $L_{si}$ for the sampling point $S_i$ comprises light that comes, after being reflected from one or more surfaces, onto the sampling point $S_i$.

Reflection from a smooth, flat surface, such as a mirror, is referred to as specular reflection. For a single incoming beam of light, the reflected beam of light is in a specific single direction for the specular reflection. In some examples, the radiance vector $L_{si}$ for the sampling point $S_i$ comprises specular reflection component of light received at the sampling point $S_i$.

In contrast to specular reflection, if a surface is rough (such as a paper, a wall), diffuse reflection occurs. In diffuse reflection, the reflected light is scattered in several directions. In some examples, the radiance vector $L_{si}$ for the sampling point $S_i$ further comprises diffuse reflection component of light received at the sampling point $S_i$.

Thus, considering the above discussed use case where the incoming light radiance on the sampling point $S_i$ is categorized into these categories, the radiance vector $L_{si}$ includes red (R), blue (B), and green (G) components of (i) direct lighting and diffuse reflection, (ii) direct lighting and specular reflection, (iii) indirect lighting and diffuse reflection, and (iv) indirect lighting and specular reflection. For example, for the sampling point $S_i$, the radiance vector $L_{si}$ is defined as:

$$L_{si} = [R_{direct\ diffuse}, G_{direct\ diffuse}, B_{direct\ diffuse},$$
$$R_{direct\ specular}, G_{direct\ specular}, B_{direct\ specular},$$
$$R_{indirect\ diffuse}, G_{indirect\ diffuse}, B_{indirect\ diffuse},$$
$$R_{indirect\ specular}, G_{indirect\ specular}, B_{indirect\ specular}] \quad \text{Equation 3}$$

where $R_{direct\ diffuse}$ is the R or red component of direct illumination and diffuse reflection, $G_{direct\ diffuse}$ is the G or green component of direct illumination and diffuse reflection, and so on. Thus, the radiance vector $L_{si}$ comprises 12 floats or 12 values, e.g., 4 RGB values characterizing 4 corresponding types of illuminations and reflections (e.g., (i) direct lighting and diffuse reflection, (ii) direct lighting and specular reflection, (iii) indirect lighting and diffuse reflection, and (iv) indirect lighting and specular reflection), although in some other examples, the radiance vector includes one or more other types of radiance features. Thus, in some examples, the radiance vector $L_{si}$ for the sampling point $S_i$ is a twelve-dimensional vector characterizing various categories of light or radiance at the sampling point $S_i$. In some embodiments, the feature identification module 103 illustrated in FIGS. 1 and 2 estimates the radiance vectors for various sampling points. For example, for the sampling points S_1_24 and S_2_24 of FIG. 3C, the radiance vectors are represented as L_1_24 and L_2_24, respectively.

Thus, during rendering, the incoming radiance is separated into direct and indirect illuminations, as well as diffuse and specular reflections. As direct illumination and specular reflection generally have higher frequency content (e.g., relative to indirect illumination and/or diffuse reflection), such categorization provides the machine learning modules (discussed herein later in turn) with better understanding of the spatial frequency components of the input radiance light.

In some examples, an auxiliary vector $A_{si}$ comprises auxiliary features of a sampling point $S_i$. The auxiliary features of the sampling point $S_i$ include different features or attributes that uniquely define or characterize the sampling point $S_i$. The auxiliary features include intrinsic properties (such as roughness) of the sampling point $S_i$, as well as properties of the sampling point $S_i$ relative to a position of the camera (such as distance or "depth" from the camera).

The auxiliary features define a manner in which incoming light is to be radiated from the sampling point $S_i$ to the camera. Discussed herein are some example auxiliary features, however, the list is not exhaustive, and the system 102 discussed herein can use any other appropriate auxiliary features as well. In some examples, the auxiliary features for a given model or scene can be included in a corresponding scene file, which can be stored in the database 148 and/or 248 of FIGS. 1 and 2.

A first example of auxiliary features comprises a "normal" feature, which indicates a direction that is normal or perpendicular to a surface of the sampling point. The direction specified by the normal feature can dictate a direction in which light is to be reflected from the sampling point, based on a direction of incoming light. The "normal" feature comprises three corresponding values, e.g., X, Y, and Z directions or coordinates, which, in combination, define the direction normal to the sampling point $S_i$. For example, the database 148 comprises a scene file, which stores a "normal map" specifying a normal direction for various pixels and sampling points within the scene.

A second example of auxiliary features comprises an "albedo" feature. Albedo is a measure of diffuse reflection from a surface and measured on a scale from 0 to 1. For example, 0 corresponds to a black color that absorbs all or significant amount of incident radiation, and 1 corresponds to a white color that reflects all or significant amount of incident radiation. Put differently, the albedo of the sampling point $S_i$ is a measure of how much light is absorbed or reflected from the sampling point $S_i$. Albedo, in some examples, can have a three-dimensional value having R, G, and B (red, green, and blue) components. For example, the scene file stores an "albedo map," which specifies albedo values for various pixels and sampling points within the scene.

A third example of auxiliary features comprises a "depth" feature. The depth of the sampling point $S_i$ is a measure of a linear distance from the virtual camera to the sampling point $S_i$. Note that when a position of the camera changes, the scene is captured from a different position, thereby changing the depth feature as well.

A fourth example of auxiliary features comprises a "camera-space position" feature. For example, the scene is generated using the camera space coordinate comprising X, Y, Z, axis, in which the camera forms an original of the coordinate system. Thus, the sampling point $S_i$ has an X, Y, and Z coordinate, which specifies a position of the sampling point $S_i$ relative to the camera. It may be noted that the depth feature can be derived from camera-space position feature. Thus, in some examples, both the depth and the camera-space position features are used for de-noising the scene, while is some other examples only one of the depth and the camera-space position features is used.

Another example of auxiliary features comprises an emissive feature that is a measure of light emissivity of the sampling point $S_i$. For example, if the sampling point $S_i$ is a light source, the sampling point $S_i$ will have a high value for this feature. In some examples, the emissive feature is a binary indicator to indicate whether the sampling point is emissive or not.

Other examples of auxiliary features comprise a metallic feature and a transmissive feature. The metallic feature is a binary indicator to indicate whether a surface is metallic or not. For example, a metal surface will be indicated using a first value of the metallic feature, whereas a plastic or glass surface will be indicated using a second value of the metallic feature. The transmissive feature is a binary indicator to indicate whether a surface is transmissive or not (e.g., how much light passes through the surface). In some examples, the transmissive and the metallic features allow the machine learning modules to differentiate between reflection and refraction, as well as between dielectric and conductor. Another example of auxiliary features comprises a roughness feature, which varies between 0 and 1 to indicate a roughness of the sampling point $S_i$.

Thus, some of the example auxiliary features are discussed herein above include the normal feature, the albedo feature, the depth feature, the camera-space position feature, the emissive feature, the metallic feature, the transmissive feature, and the roughness feature. For the sampling point $S_i$, the auxiliary vector $A_{si}$ is formed (e.g., by the feature identification module 103 of FIGS. 1 and 2) as:

$$A_{si} = [X_{normal\ feature}, Y_{normal\ feature}, Z_{normal\ feature}, R_{albedo},$$
$$G_{albedo}, B_{albedo}, \text{Depth}, X_{camera\text{-}space\ position},$$
$$Y_{camera\text{-}space\ position}, Z_{camera\text{-}space\ position}, \text{Emissive}, \text{Metallic}, \text{Transmissive}, \text{Roughness}] \quad \text{Equation 4}$$

Thus, the auxiliary vector $A_{si}$ corresponding to the sampling point $S_i$ has fourteen example values: the X, Y, Z coordinates of the normal feature; the R, G, B values of the albedo feature; the depth feature; the X, Y, Z coordinates of the camera-space position feature; the emissive feature; the metallic feature; the transmissive feature; and the roughness feature. Thus, in such example embodiments, the auxiliary vector $A_{si}$ corresponding to the sampling point $S_i$ is a fourteen-dimensional vector.

Each sampling point $S_i$ has a corresponding auxiliary vector $A_{si}$. For example, for the sampling point S_1_24 of the pixel Y24 of FIG. 3C, the corresponding auxiliary vector is A_1_24. Similarly, for the sampling point S_2_24 of the pixel Y24 of FIG. 3C, the corresponding auxiliary vector is A_2_24, and so on.

As discussed, in some embodiments, the radiance vector $L_{si}$ for the sampling point $S_i$ is a twelve-dimensional vector representing characteristics of incoming light on the sampling point $S_i$. In some such embodiments, the auxiliary vector $A_{si}$ corresponding to the sampling point $S_i$ is a fourteen-dimensional vector representing characteristics of the sampling point. Thus, a combination of the radiance vector $L_{si}$ and the auxiliary vector $A_{si}$ corresponding to the sampling point $S_i$, can be used to calculate amount of light radiated from the sampling point $S_i$. Thus, the combination of the radiance vector $L_{si}$ and the auxiliary vector $A_{si}$ can be used to generate photo-realistic scene, where the objects within the image have real-life like lighting effects. The system 102 and/or 202 use the radiance vector $L_{si}$ and the auxiliary vector $A_{si}$ to de-noise the noisy image 340, where the noisy image 340 is originally rendered using a low SPP (e.g., 8 SPP) Monte Carlo methodology, as will be discussed in turn.

Figure 4:
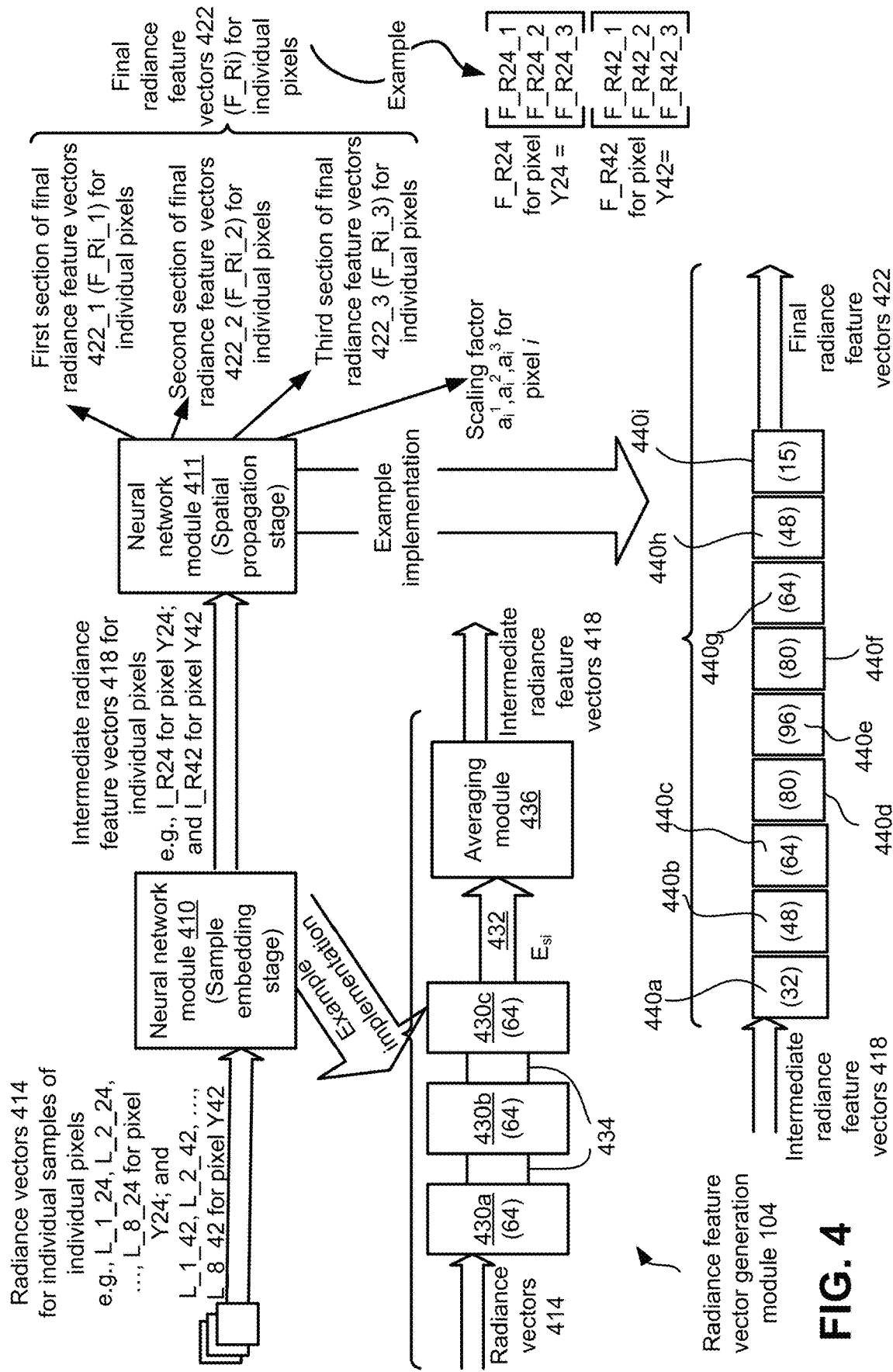
FIG. 4 illustrates a radiance feature vector generation module configured to receive a corresponding radiance vector for each of a plurality of sampling points of a plurality of pixels of a scene, and to generate a corresponding final radiance vector for each pixel of the plurality of pixels, where the final radiance vectors are usable to denoise a noisy image of the scene, in accordance with some embodiments of the present disclosure.

FIG. 4 illustrates a radiance feature vector generation module 104 (also referred to herein as module 104, illustrated in FIGS. 1 and 2) configured to receive radiance vectors for each of a plurality of sampling points of a plurality of pixels of a scene, and to generate final radiance vectors for each pixel of the plurality of pixels, where the final radiance vectors are usable to denoise a noisy image of the scene, in accordance with some embodiments of the present disclosure.

Inputs to the module 104 are the radiance vectors 414 of each of a plurality of sampling points of a plurality of pixels of the scene to be rendered. For example, as previously discussed with respect to equation 3, a radiance vector $L_{si}$ for a sampling point $S_i$ is a twelve-dimensional vector representing characteristics of incoming light on the sampling point $S_i$. Referring to FIGS. 3C and 4, for example, for the pixel Y24, the sampling points are S_1_24, S_2_24, . . . , S_8_24; and for pixel Y42, the sampling points are S_1_42, S_2_42, . . . , S_8_42. The module 104 receives radiance vectors 414. For example, for the pixel Y24 and for the sampling points S_1_24, S_2_24, . . . , S_8_24, the module 104 receives radiance vectors L_1_24, L_2_24, . . . , L_8_24, respectively. Similarly, for example, for the pixel Y42 and for the sampling points S_1_42, S_2_42, . . . , S_8_42, the module 104 receives radiance vectors L_1_42, L_2_42, . . . , L_8_42, respectively.

In some embodiments, the module 104 outputs final radiance feature vectors 422 (which is also referred to simply as "radiance feature vectors 422") for each pixel of the scene. For example, the module 104 outputs a final radiance feature vector F_R24 for the pixel Y24, a final radiance feature vector F_R42 for the pixel Y42, and in general, a final radiance feature vector F_Ri for the pixel Yi. The letter "F" in the final radiance feature vector F_Ri indicates that this is the "final" radiance feature vector. The letter "R" in the final radiance feature vector F_Ri indicates that this is the final "radiance" feature vector.

The module 104 comprises a neural network module 410 (also referred to herein as "module 410"), which is also referred to as a sample embedding stage of the module 104. The neural network module 410 comprising the sample embedding stage encodes each noisy input data per-sample (e.g., the radiance vectors 414) for sample embedding. Specifically, for a given pixel, the module 410 receives radiance vectors 414 of associated sampling points. The module 104 generates, based on the radiance vectors 414 of associated sampling points of the given pixel, a corresponding intermediate radiance feature vector 418 for the pixel.

The neural network module 410 is a machine learning module that has tunable or learnable weights, which are tuned during a training phase of the module 410. The training phase can use ground truth images, such as the image 300 of FIG. 3A, for training the weights of the module 410.

For example, for the eight sampling points of the pixel Y24, the module 410 receives corresponding radiance vectors L_1_24, L_2_24, . . . , L_8_24, respectively. The module 410 generates an intermediate radiance feature vector I_R24 for the pixel Y24. The module 410 basically performs some kind of averaging of the radiance vectors L_1_24, L_2_24, . . . , L_8_24, to generate the corresponding intermediate radiance feature vector I_R24 however, this is not a simple averaging function. Rather, the module 410 is trained to perform an intelligent and weighted averaging, to generate the intermediate radiance feature vector I_R24 from the eight radiance vectors L_1_24, L_2_24, . . . , L_8_24.

It may be noted that the intermediate radiance feature vector I_R24 for the pixel Y24 is generated from the radiance vectors L_1_24, L_2_24, . . . , L_8_24 associated with the sampling points of the pixel Y24. The intermediate radiance feature vector I_R24 for the pixel Y24 is not influenced by radiance vectors of sampling points of any neighboring pixels, such as neighboring pixel Y33. Thus, a radiance vector of a sampling point of a pixel cannot influence the intermediate radiance feature vector of a neighboring pixel. Put differently, for a pixel i, the intermediate radiance feature vector I_Ri is generated based on radiance vectors of sampling points within the pixel i, and is not influenced by any other radiance vector of any other sampling point outside the pixel i.

FIG. 4 also illustrates an example implementation of the module 410. In some embodiments, the module 410 comprises a 3-stage neural network comprising neural network stages 430a, 430b, 430c. A leaky rectified linear unit (ReLU) 434 is between the stages 430a and 430b, and another leaky ReLU 434 is between the stages 430b and 430c. The ReLUs 434, for example, introduce non-linearity in the module 410.

The stages 430a, 430b, 430c encode, for each sampling point, a corresponding radiance vector. For example, the stages 430a, 430b, 430c detect patterns in the data, and determine how the radiance vectors of sampling points within a specific pixel should be combined or averaged to output the intermediate radiance feature vector 418 for that specific pixel. In some embodiments, the stages 430a, 430b, 430c comprise tunable or learnable weights, which are tuned during a training phase of the module 410. For example, the module 410 is trained to identify how a plurality of radiance vectors 414 of various sampling points of a specific pixel are to be processed and averaged, to generate the intermediate radiance feature vector 418 for that specific pixel. Merely as an example, the module 410 detects patterns in the radiance vectors, and determines a manner in which the radiance vectors are to be combined or averaged to form the intermediate radiance feature vector 418.

In the example implementation of FIG. 4, each intermediate radiance feature vector 418 is a 64-dimensional vector. The first stage 430a receives the 12-dimensional radiance vectors 414, and converts each vector into a corresponding 64-dimensional vector. Both stages 430b, 430c also operate in the 64-dimensional space, and output the 64-dimensional intermediate radiance feature vector 418 for each pixel. Thus, the stages 430a, 430b, 430c transform the 12-dimensional radiance vectors 414 into the output space of 64 dimensions. As discussed, the stages 430a, 430b, 430c consider sampling points within each pixel, and there is no cross-influence between pixels (e.g., a sampling point of a first pixel influences other sampling points of the first pixel, but does not influence sampling points of other pixels). Thus, there is no spatial propagation of radiance property across adjacent or neighboring pixels.

The output 432 of the stage 430c is a 64-dimensional vector $E_{si}$ per sampling point. Thus, each pixel would have 8 different outputs 432. For example, for the pixel Y24, the output 432 would be E_1_24, E_2_24, . . . , E_8_24, corresponding to the 8 underlying sampling points (e.g., assuming 8 SPP, as discussed with respect to FIG. 3C).

Thus, as discussed, the sampling embedding components Ψ (e.g., stages 430a, 430b, 430c) receive radiance vectors $L_{si}$ for each sampling point s in each pixel i, and encode to a sample encoding $E_{si}$, such that $\Psi: \mathbb{R}^{12} \to \mathbb{R}^d$, $\Psi(L_{si})=E_{si}$, where $E_{si}$ is the output 432 of the stage 430c. Here, as an example, d is chosen to be 64 in the example of FIG. 4.

An averaging module 436 then, for a specific pixel, averages the corresponding 8 outputs $E_{si}$, to generate a corresponding intermediate radiance feature vector 418 for the pixel. For example, for a pixel i with sampling points represented generally by s, the output of the averaging module 436 is:

$$I\_R_i = \frac{1}{N}\sum_{s=1}^{N} E_{si} \qquad \text{Equation 5}$$

In equation 5, N is 8 for the example implementation of FIG. 3C where 8 SPP is used. Thus, in accordance with equation 5, for the pixel Y24, the averaging module 436 averages the outputs E_1_24, E_2_24, . . . , E_8_24, to generate a corresponding intermediate radiance feature vector I_R24 for the pixel Y24. In some examples, the averaging enforces that the order of samples in a pixel does not change the output, and permutation invariance is preserved.

The intermediate radiance feature vectors 418 are indicative of the radiance vectors of equation 3. For example, for a specific pixel, the intermediate radiance feature vector 418 is an average of encoded versions of the corresponding radiance vectors of the corresponding sampling points, where the encoding is done by the stages 430a, 430b, 430c using trainable weights of these neural network stages. Thus, the intermediate radiance feature vector 418 of a pixel is an intelligent average of radiance vectors of the corresponding sampling points.

Referring again to FIG. 4, the module 104 comprises another neural network module 411 (also referred to herein as module 411), which is also referred to herein as a spatial propagation stage. The module 411 receives, for each pixel of the scene, a corresponding intermediate radiance feature vector 418 from the module 410. For example, the module 411 receives intermediate radiance feature vector I_R24 for the pixel Y24, intermediate radiance feature vector I_R42 for the pixel Y42, and in general, intermediate radiance feature vector I_Ri for a pixel i.

In some embodiments, the module 411 generates, for each pixel, a corresponding final radiance feature vector 422. For example, the module 411 generates final radiance feature vector F_R24 for pixel Y24, final radiance feature vector F_R42 for pixel Y42, and in general, final radiance feature vector F_Ri for a pixel i.

Figure 7A:
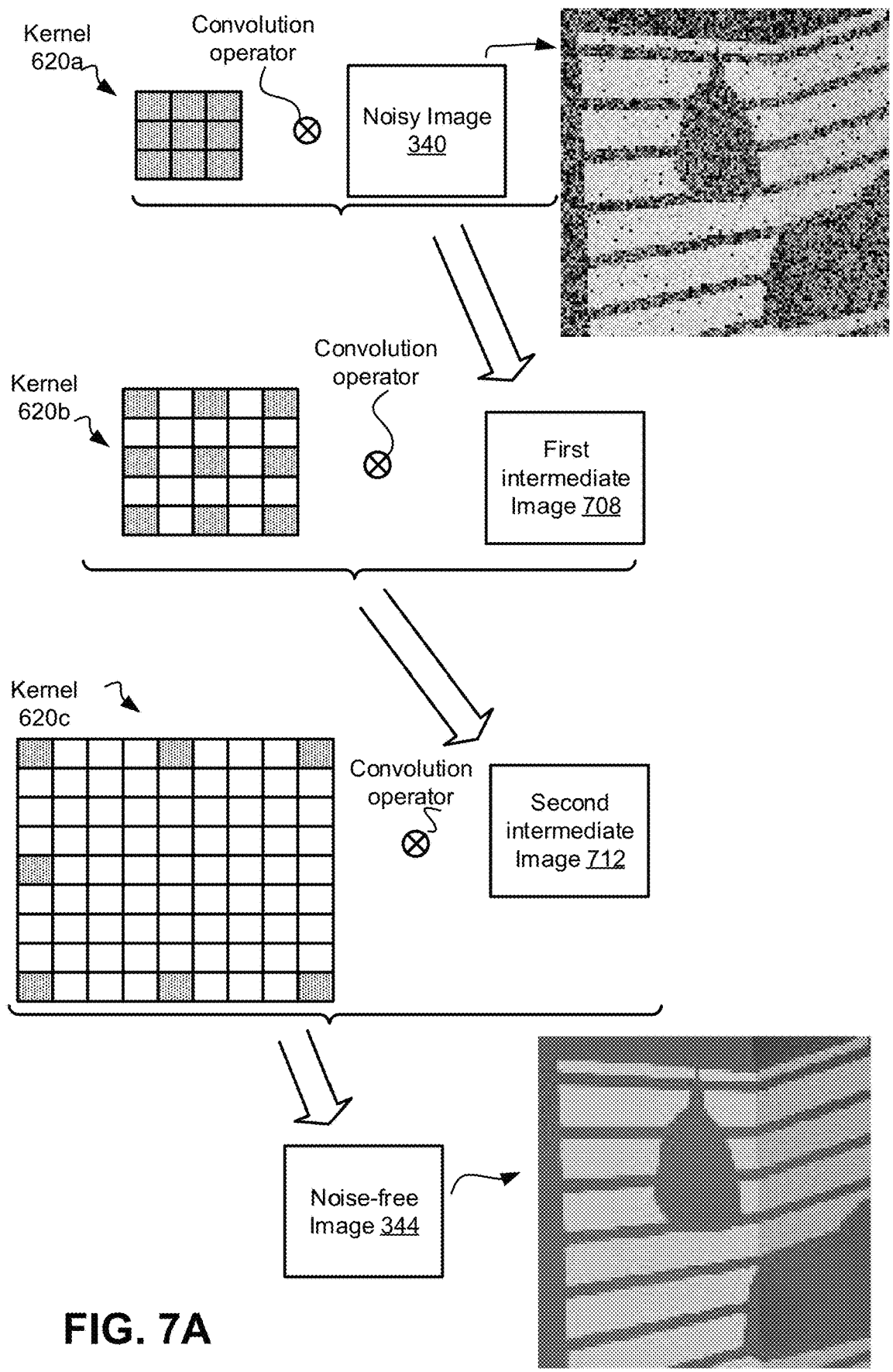
FIG. 7A illustrates de-noising a noisy image using multiple de-noising stages, where each stage uses a subset of corresponding kernels, in accordance with some embodiments of the present disclosure.

As will be discussed in further detail, each final radiance feature vector comprises multiple sections. In the example implementation of FIGS. 4 and 7A (where FIG. 7A illustrates three stage de-noising operations), each final radiance feature vector is divided into 3 sections. That is, a number of sections of a final radiance feature vector corresponds to a number of de-noising stages to be used.

For example, each final radiance feature vector is 15-dimensional (e.g., includes 15 values) in the example of FIG. 4, and the first five values form a first section of the final radiance feature vector 422_1, the next five values form a second section of the final radiance feature vector 422_2, and the final five values form a third section of the final radiance feature vector 422_3. For example, as illustrated in FIG. 4, the final radiance feature vector F_R24 is divided as [F_R24_1, F_R24_2, F_R24_3], and the final radiance feature vector F_R42 is divided as [F_R42_1, F_R42_2, F_R42_3]. Each section of a final radiance feature vector is used to generate a corresponding kernel, as will be discussed in further detail herein with respect to FIGS. 6A, 6B, and 6C.

In some embodiments, the module 411 also generates, for each pixel i, three corresponding scaling factors $a_i^1$, $a_i^2$, and $a_i^3$. The number of scaling factors generated for each pixel corresponds to a number of de-noising stages to be used (as illustrated in the example of FIG. 7A, 3 stages are used). For example, the module 411 generates scaling factor $a_{24}^1$, $a_{24}^2$, and $a_{34}^3$ for the pixel Y24. These scaling factors introduce asymmetry during kernel generation, as will be discussed in further detail herein in turn.

Thus, as discussed, the spatial propagation components ((e.g., module 411) receive an intermediate radiance vector I_R_i for a pixel i, and outputs three different final radiance feature vectors F_Ri_k (where k is 1, 2, and 3) for the pixel i, such that $\Phi: \mathbb{R}^{64} \to \mathbb{R}^{15}$ $\Phi(I\_R_i)=[F\_Ri\_1, F\_Ri\_2, F\_Ri\_3, a_i^1, a_i^2, a_i^3]$. Here, F_Ri_1 for pixel Y24 is F_R24_1, F_Ri_2 for pixel Y24 is F_R24_2, and so on.

In some embodiments, the module 411 cross-correlates radiance features of neighboring pixels, to generate the final radiance feature vectors. For example, the module 411 determines how radiance values associated with a pixel can contribute to a neighboring pixel. For example, assume a shadowed section 348 of a wall of the scene 300 of FIG. 3B (labeled in image 344), and an adjacent lighted section 346 of the wall. Neighboring pixels within the section 346 should have somewhat similar radiance attributes (e.g., similar radiance vectors), and hence, the module 411 can learn about radiance attributes of a pixel within the section 346 from radiance attributes of a neighboring pixel within the same section 346. Similarly, neighboring pixels within the section 348 should have somewhat similar radiance attributes (e.g., similar radiance vectors), and hence, the module 411 can learn about radiance attributes of a pixel within the section 348 from radiance attributes of a neighboring pixel within the same section 348. However, the module 411 may not be able to learn about radiance attributes of a pixel within the section 346 from radiance attributes of a neighboring pixel within the adjacent section 348. Similarly, the module 411 may not be able to learn about radiance attributes of a pixel within the section 348 from radiance attributes of a neighboring pixel within the adjacent section 346.

Thus, in some embodiments, the module 411 spatially propagates radiance attributes of a first pixel to one or more neighboring pixels, e.g., if the first pixel and one or more neighboring pixels have some similar radiance attributes and/or are on a same or similar section of the image. However, if the first pixel is along or near an edge (e.g., near an edge of the sections 346 and 348), then propagation of the radiance attributes may not occur across the edge of the two sections. Thus, radiance feature vectors of neighboring pixels within the section 346 can influence each other, but may not substantially influence pixels of the section 348. Similarly, radiance feature vectors of neighboring pixels within the section 348 can influence each other, but may not substantially influence pixels of the section 346.

The module 411 comprises, in the example implementation of FIG. 4, stages 440a, 440b, . . . , 440i, e.g., nine different stages. Each stage 440 in FIG. 4 includes a number, which represents a capacity or number of layers within the corresponding stage. Merely as an example, stage 440a comprises 32 layers, stage 440b comprises 48 layers, stage 440c comprises 64 layers, stage 440d comprises 80 layers, stage 440e comprises 96 layers, stage 440f comprises 80 layers, stage 440g comprises 64 layers, stage 440h comprises 48 layers, and stage 440i comprises 15 layers. In some embodiments, two times (2×) maxpooling is performed after individual one or more (e.g., each) of the stages 440a, 440b, 440c and 440d. In some embodiments, two time (2×) bilinear upsampling is performed after individual one or more (e.g., each) of the stages 440e, 440f, 440g, and 440h.

The stages 440 comprise trainable weights that are tuned during a training phase of the module 411. Thus, once trained, the module 411 can cross-correlate radiance feature vectors of neighboring pixels, to obtain better estimate of radiance attributes of various pixels. As discussed, the cross-correlation takes into account location of the pixels— if a pixel is on or near an edge of a section, radiance attributes of the pixel are not influenced by (or do not influence) radiance attributes of pixel on other side of the edge.

In the example, implementation of FIG. 4, the module 411 transforms a 64-dimensional intermediate radiance feature vector 418 of a pixel to a 15-dimensional final radiance feature vector 422 of the pixel. During the transformation, the radiance feature vector is possibly influenced by radiance attributes of one or more neighboring pixels having similar light conditions.

For example, assume that the intermediate radiance feature vectors of the pixels Y24, Y33, and Y45 are I_R24, I_R33, and I_R45, respectively. The module 411 generates final radiance feature vectors F_R24, F_R33, and F_R45, respectively, for the pixels Y24, Y33, and Y45. Thus, the module 411 transforms the 64-dimensional intermediate radiance feature vector I_R24 of the pixel Y24 to the 15-dimensional final radiance feature vector F_R24 of the pixel Y24. During the transformation process, the final radiance feature vector F_R24 is possibly influenced by the radiance attributes of one or both (or neither) of the intermediate radiance feature vectors I_R33 and I_R45 of the neighboring pixels Y33 and Y45, respectively.

Figure 5:
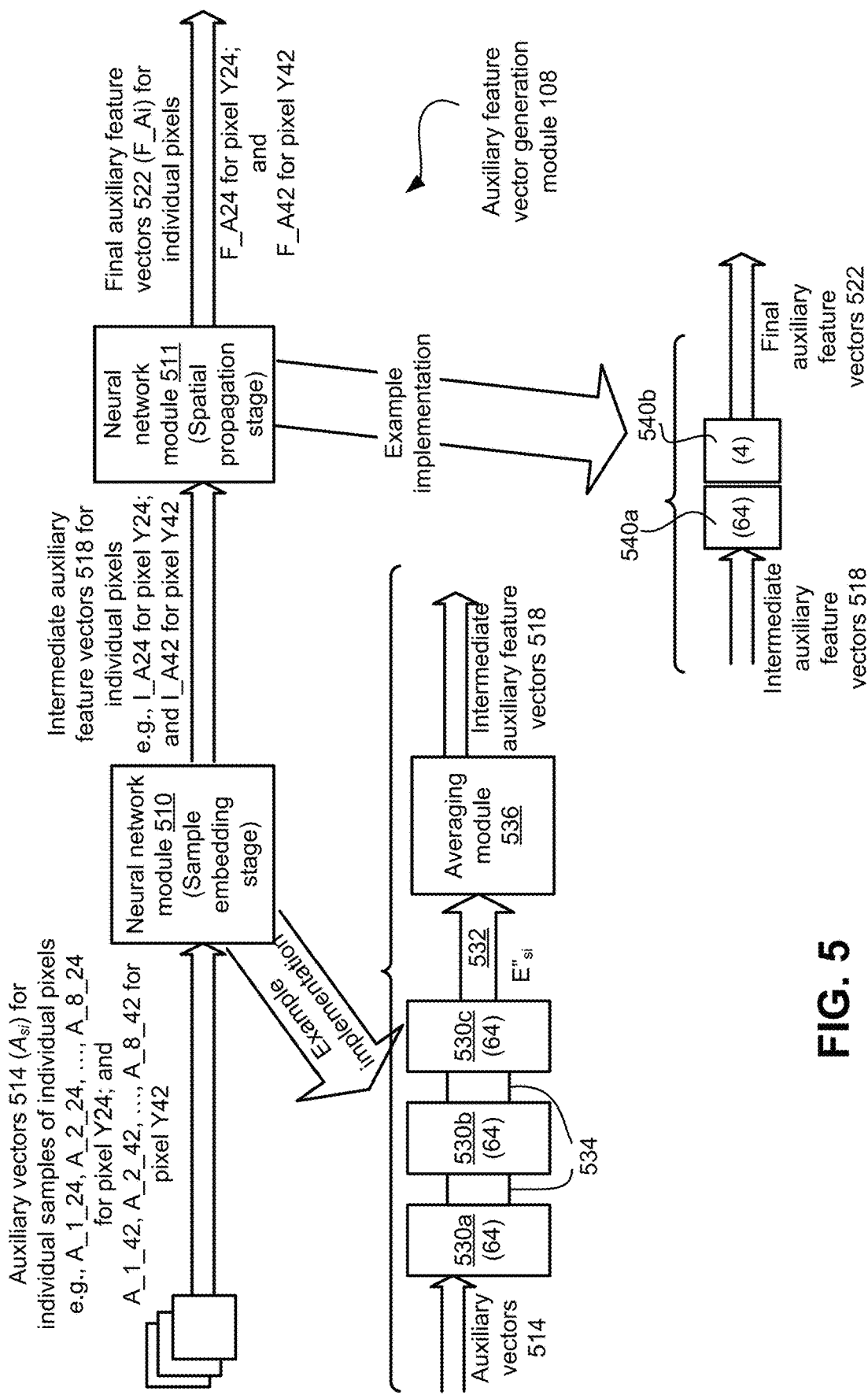
FIG. 5 illustrates an auxiliary feature vector generation module configured to receive a corresponding auxiliary vector for each of a plurality of sampling points of a plurality of pixels of a scene, and to generate a corresponding final auxiliary vector for each pixel of the plurality of pixels, where the final auxiliary vectors are usable to denoise a noisy image of the scene, in accordance with some embodiments of the present disclosure.

FIG. 5 illustrates an auxiliary feature vector generation module 108 (also referred to herein as module 108, illustrated in FIGS. 1 and 2) of the systems 102 and/or 202 configured to receive a corresponding auxiliary vector for each of a plurality of sampling points of a plurality of pixels of a scene, and to generate a corresponding final auxiliary vector for each pixel of the plurality of pixels, where the final auxiliary vectors are usable to denoise a noisy image of the scene, in accordance with some embodiments of the present disclosure.

Recall that equation 3 discussed herein previously relates to radiance vector $L_{si}$, whereas equation 4 relates to auxiliary vector $A_{si}$. The radiance vectors $L_{si}$ are input to the module 104 of FIG. 4, whereas the auxiliary vectors $A_{si}$ are input to the module 108 of FIG. 5. Thus, the module 104 of FIG. 4 is to process radiance related information, while the module 108 of FIG. 5 is to process auxiliary features related information. Other than this basic difference, there is some structural similarity between the modules 104 and 108, as will be discussed in turn.

As discussed, inputs to the module 108 of FIG. 5 are the auxiliary vectors 514 of each of a plurality of sampling points of a plurality of pixels of the scene to be rendered. For example, as previously discussed, an auxiliary vector $A_{si}$ for a sampling point $S_i$ is, for example, a fourteen-dimensional vector representing characteristics of the surface of sampling point $S_i$ and location of the sampling point $S_i$ relative to the camera position, as discussed with respect to equation 4. Referring to FIGS. 3C and 5, for example, for the pixel Y24, the sampling points are S_1_24, S_2_24, . . . , S_8_24; and for pixel Y42, the sampling points are S_1_42, S_2_42, . . . , S_8_42. The module 108 receives auxiliary vectors 514. For example, for the pixel Y24 and for the sampling points S_1_24, S_2_24, . . . , S_8_24, the module 108 receives auxiliary vectors A_1_24, A_2_24, . . . , A_8_24, respectively. Similarly, for the pixel Y42 and for the sampling points S_1_42, S_2_42, . . . , S_8_42, the module 104 receives auxiliary vectors A_1_42, A_2_42, . . . , A_8_42, respectively. Generation of auxiliary vectors have been discussed with respect to equation 4.

In some embodiments, the module 108 outputs a corresponding final auxiliary feature vector 522 for each pixel of the scene. For example, the module 108 outputs a final auxiliary feature vector F_A24 for the pixel Y24, a final auxiliary feature vector F_A42 for the pixel Y42, and in general, a final auxiliary feature vector F_Ai for the pixel i. The letter "F" in the final auxiliary feature vector F_Ai indicates that this is the "final" auxiliary feature vector. The letter "A" in the final auxiliary feature vector F_Ai indicates that this is the final "auxiliary" feature vector.

The module 108 comprises a neural network module 510 (also referred to herein as "module 510"), which is also referred to as a sample embedding stage of the module 108. The neural network module 510 comprising the sample embedding stage encodes each noisy input data per-sample (e.g., the auxiliary vectors 514) for sample embedding. Specifically, for a given pixel, the module 510 receives auxiliary vectors 514 of associated sampling points. The module 108 generates, based on the auxiliary vectors 514 of associated sampling points of the given pixel, a corresponding intermediate auxiliary feature vector 518 for the pixel.

For example, for the eight sampling points of the pixel Y24, the module 510 receives corresponding auxiliary vectors A_1_24, A_2_24, . . . , A_8_24, respectively. The module 510 generates an intermediate auxiliary feature vector I_A24 for the pixel Y24. The module 510 basically performs some kind of averaging of the auxiliary vectors A_1_24, A_2_24, . . . , A_8_24, to generate the corresponding intermediate auxiliary feature vector I_A24 however, this is not a simple averaging function. Rather, the module 510 performs an intelligent and weighted averaging, to generate the intermediate auxiliary feature vector I_A24 from the eight auxiliary vectors A_1_24, A_2_24, ..., A_8_24.

It may be noted that the intermediate auxiliary feature vector I_A24 for the pixel Y24 is generated from the auxiliary vectors A_1_24, A_2_24, ..., A_8_24 associated with the sampling points of the pixel Y24. The intermediate auxiliary feature vector I_A24 for the pixel Y24 is not influenced by auxiliary vectors of sampling points of any neighboring pixels, such as neighboring pixel Y33. Thus, an auxiliary vector of a sampling point of a pixel cannot influence the intermediate auxiliary feature vector of a neighboring pixel. Put differently, for a pixel i, the intermediate auxiliary feature vector I_Ai is generated based on auxiliary vectors of sampling points within the pixel i, and is not influenced by any other auxiliary vector of any other sampling point outside the pixel i.

FIG. 5 also illustrates an example implementation of the module 510 comprising a 3-stage neural network including neural network stages 530a, 530b, 530c. A leaky ReLU 534 is between the stages 530a and 530b, and another leaky ReLU 534 is between the stages 530b and 530c. The ReLUs 534, for example, introduce non-linearity in the module 510.

The stages 530a, 530b, 530c encode, for each sample, a corresponding auxiliary vector. For example, the stages 530a, 530b, 530c detect patterns in the data, and determine how the auxiliary vectors should be combined or averaged to output the intermediate auxiliary feature vectors 518. In some embodiments, the stages 530a, 530b, 530c comprise tunable or learnable weights, which are tuned during a training phase of the module 510. For example, the module 510 is trained to identify how a plurality of auxiliary vectors 514 of various sampling points of a specific pixel are to be processed and averaged, to generate the intermediate auxiliary feature vector 518 for that specific pixel.

In the example implementation of FIG. 5, each intermediate auxiliary feature vector 518 is a 64-dimensional vector. The first stage 530a receives the 12-dimensional auxiliary vectors 514, and converts each vector into a 64-dimensional vector. Both stages 530b, 530c also operate in the 64-dimensional space, and output the 64-dimensional intermediate auxiliary feature vector 518 for each pixel. Thus, the stages 530a, 530b, 530c transform the 12-dimensional auxiliary vectors 514 into the output space of 64 dimensions. As discussed, the stages 530a, 530b, 530c consider sampling points within each pixel, and there is no cross-influence between pixels (e.g., a sampling point of a first pixel influences other sampling points of the first pixel, but does not influence sampling points of other pixels). Thus, there is no spatial propagation of auxiliary property across pixels.

The output 532 of the stage 530c is a 64-dimensional vector $E''_{si}$ per sampling point $S_i$. Thus, each pixel would have 8 different outputs 532 (e.g., assuming 8 SPP, as discussed with respect to FIG. 3C). For example, for the pixel Y24, the output 532 would be E"_1_24, E"_2_24, ..., E"_8_24, corresponding to the 8 underlying sampling points.

Thus, as discussed, the sampling embedding components Ψ" (e.g., stages 530a, 530b, 530c) receive auxiliary vectors $A_{si} \in \mathbb{R}^{14}$ for each sampling point s in each pixel, and encode to a sample encoding $E''_{si}$, such that Ψ": $\mathbb{R}^{14} \to \mathbb{R}^d$, Ψ"($A_{si}$)=$E''_{si}$, where $E''_{si}$ is the output 532 of the stage 530c. Here, as an example, d is chosen to be 64 in the example of FIG. 5.

An averaging module 536 then, for a specific pixel, averages the corresponding 8 outputs, to generate a corresponding intermediate auxiliary feature vector 518 for the pixel. For example, for a pixel i with sampling points represented generally by s, the output of the averaging module 536 is:

$$I\_A_i = \frac{1}{N}\sum_{s=1}^{N} E''_{si} \qquad \text{Equation 6}$$

In equation 6, N is 8 for the example implementation of FIG. 3C where 8 SPP is used. Thus, in accordance with equation 6, for the pixel Y24, the averaging module 536 averages the outputs E"_1_24, E"_2_24, ..., E"_8_24, to generate a corresponding intermediate auxiliary feature vector I_A24 for the pixel Y24. In some examples, the averaging enforces that the order of samples in a pixel does not change the output, and permutation invariance is preserved.

The intermediate auxiliary feature vectors 518 are indicative of the auxiliary vectors of equation 4. For example, for a specific pixel, the intermediate auxiliary feature vector 518 is an average of encoded versions of the corresponding auxiliary vectors of the corresponding sampling points, where the encoding is done by the stages 530a, 530b, 530c using trainable weights of these neural network stages.

In some embodiments, the module 108 further comprises another neural network module 511 (also referred to herein as module 511), which is also referred to herein as a spatial propagation stage. The module 511 receives, for each pixel of the scene, corresponding intermediate auxiliary feature vector 518 from the module 510. For example, the module 511 receives intermediate auxiliary feature vector I_A24 for the pixel Y24, and intermediate radiance feature vector I_A42 for the pixel Y42.

In some embodiments, the module 511 generates, for each pixel, a corresponding final auxiliary feature vector 522 (represented generally as F_$A_i$). For example, the module 511 generates a final auxiliary feature vector F_A24 for pixel Y24, a final auxiliary feature vector F_A42 for pixel Y42, and in general, a final auxiliary feature vector F_A, for pixel i.

Thus, as discussed, the spatial propagation components Φ" (e.g., module 511) receive intermediate an auxiliary vector I_$A_i$ for each pixel i, and output a corresponding final radiance feature vector F_Ai for the pixel i, such that Φ": $\mathbb{R}^{64} \to \mathbb{R}^4$, Φ (I_$A_i$)=F_Ai.

It may be noted that each final radiance feature vector of the module 104 of FIG. 4 were divided into multiple sections (e.g., a final radiance feature vector was a concatenation of three underlying sections of the final radiance feature vector). In contrast, in some embodiments, no subdivision of the final auxiliary feature vector is provided by the module 108. However, in some other embodiments, a final auxiliary feature vector can also be sub-divided into 3 corresponding sections, each used to generate a corresponding kernel. It may be noted that the module 411 of FIG. 4 generates scaling factors $a_j$. In contrast, in some embodiments, the module 511 of FIG. 5 may not generate any such scaling factors.

In some embodiments, the module 511 cross-correlates auxiliary features of neighboring pixels, similar to the cross-relation of radiance features by the module 411 of the module 104 of FIG. 4. For example, the module 511 determines how auxiliary feature values associated with a pixel can contribute to a neighboring pixel. For example, assume a shadowed section 348 of a wall of the scene 300 of FIG. 3B (labeled in image 344), and an adjacent lighted section 346 of the wall. Both sections 346 and 348 are part of a wall, and can have similar auxiliary features. However, the auxiliary features of the wall are to differ from that of a picture hanging on the wall.

Thus, in some instances, neighboring pixels within the sections 346 and 348 should have somewhat similar auxiliary feature attributes (e.g., similar auxiliary vectors), and hence, the module 511 can learn about auxiliary feature attributes of a pixel within the section 346 from auxiliary feature attributes of one or more neighboring pixels within the sections 346 and/or 348. However, the module 511 may not be able to learn about auxiliary feature attributes of a pixel within the section 346 from auxiliary feature attributes of a neighboring pixel of a picture hanging on the wall.

Thus, in some embodiments, the module 511 spatially propagates auxiliary feature attributes of a first pixel to one or more neighboring pixels, e.g., if the first pixel and one or more neighboring pixels have some similar auxiliary feature attributes (e.g., when each of these pixels are part of a wall). However, if the first pixel is on a wall and a second pixel is on a picture hanging on the wall, then propagation of the auxiliary feature attributes may not occur between the first and second pixels. Thus, auxiliary feature vectors of neighboring pixels within the sections 346 and/or 348 can influence each other, but may not substantially influence pixels of the picture hanging on the wall.

The module 511 comprises, in the example implementation of FIG. 5, stages 540a and 540b, e.g., two different stages. Each stage 540 in FIG. 5 includes a number, which represents a capacity or number of layers within the stage. For example, the stage 540a comprises 64 layers, and the stage 540b comprises 4 layers. The stages 540 comprise trainable or learnable weights that are tuned during a training phase of the module 511. Thus, once trained, the module 511 can cross-correlate auxiliary feature vectors of one or more neighboring pixels, to obtain better estimate of auxiliary attributes of various pixels.

Thus, the module 511 transforms a 64-dimensional intermediate auxiliary feature vector 518 of a pixel to a 4-dimensional final auxiliary feature vector 522 of the pixel. During the transformation, the auxiliary feature vector is possibly influenced by auxiliary attributes of one or more neighboring pixels.

For example, assume that the intermediate auxiliary feature vectors of the pixels Y24, Y33, and Y45 are I_A24, I_A33, and I_A45, respectively. The module 511 generates final auxiliary feature vectors F_A24, F_A33, and F_A45, respectively, for the pixels Y24, Y33, and Y45. Thus, the module 511 transforms the 64-dimensional intermediate auxiliary feature vector I_A24 of the pixel Y24 to the 4-dimensional final auxiliary feature vector F_A24 of the pixel Y24. During the transformation process, the final auxiliary feature vector F_A24 is possibly influenced by the radiance attributes of one or both (or neither) of the intermediate auxiliary feature vectors I_A33 and I_A45 of the neighboring pixels Y33 and Y45, respectively.

It may be noted that the number of stages in the module 511 is two, which is less than the nine stages included in the module 411 of the module 104 of FIG. 4. Thus, the spatial propagation module 511 of the module 108 of FIG. 5 has lesser number of stages than the spatial propagation module 411 of the module 104 of FIG. 4. In some instances, there can be higher variation in radiance data among neighboring pixels than variation of auxiliary feature attributes among neighboring pixels. For example, pixels of an entire wall, such as the wall illustrated in the scene 300, may have somewhat similar auxiliary feature attributes. However, the same wall has different sections that have different radiance attributes (e.g., some sections of the wall are in shadow, while some other sections of the wall are lighted). Accordingly, detecting radiance attribute data patterns in pixels is, in some instances, more challenging than auxiliary feature data pattern detection. Accordingly, in some embodiments, the spatial propagation module 511 of the module 108 of FIG. 5 has lesser number of stages than the spatial propagation module 411 of the module 104 of FIG. 4.

Figure 6A:
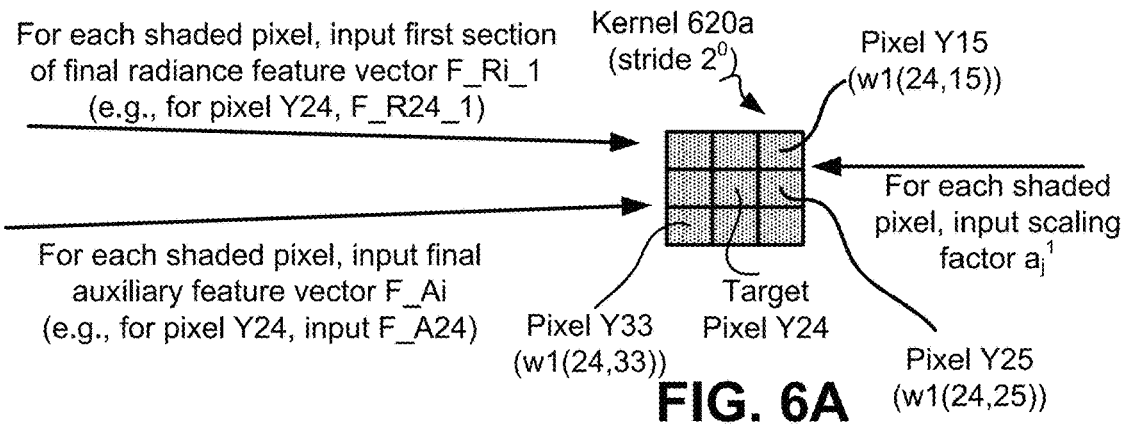
FIGS. 6A, 6B, 6C illustrate generation of respective example kernels, which are used as filters to de-noise a noisy image, in accordance with some embodiments of the present disclosure.
Figure 6B:
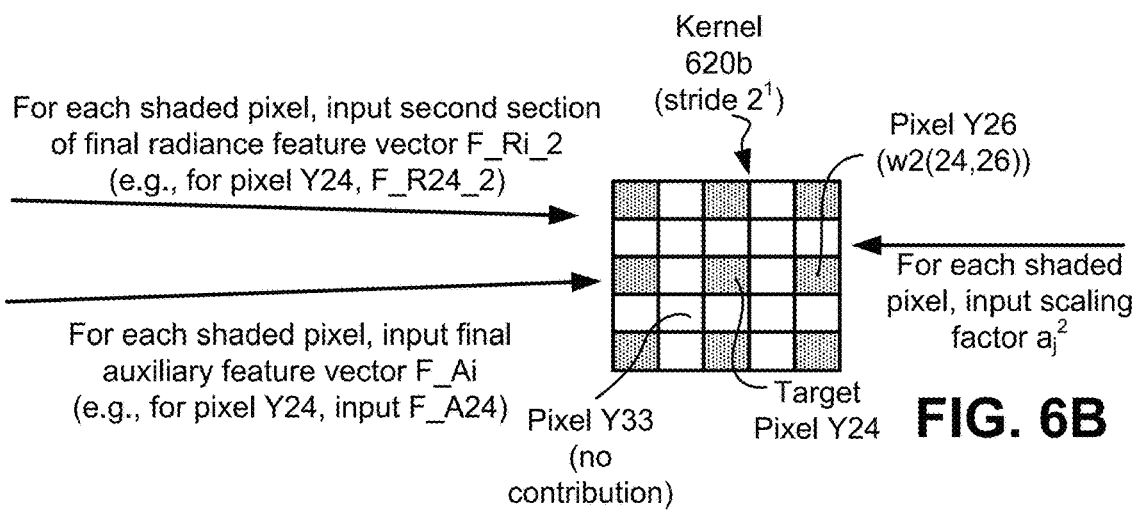
Figure 6C:
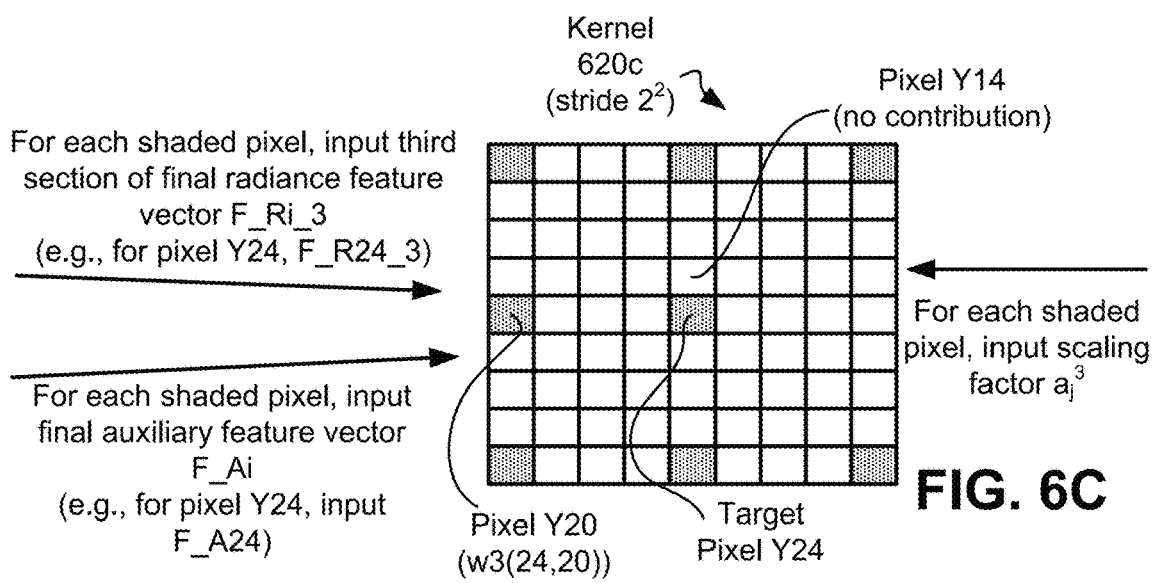

FIGS. 6A, 6B, 6C illustrate generation of respective kernels (e.g., by the kernel generation module 112 of FIGS. 1 and 2), which are used as filters to de-noise a noisy image, in accordance with some embodiments of the present disclosure. As previously explained, a kernel is a two-dimensional convolution matrix, or a mask or a filter comprising a small matrix (e.g., small relative to the image on which it is applied). Such kernels can be used in image processing applications, for instance, for blurring, sharpening, embossing, edge detection, and/or other image processing applications, such as used for de-noising in this disclosure.

For example, referring to FIG. 6A, this figure illustrates generation of a kernel 620a for a target pixel Y24 of FIG. 3C. For example, the kernel 620a is of stride $2^0=1$. Thus, each pixel that is 1 pixel apart from the target pixel Y24 is considered while generating the kernel 620a. For example, assume a kernel comprising a matrix of pixels having a stride X and a target pixel at its center. Neighboring pixels within the kernel that are X-pixels apart from the target pixel are assigned non-zero weights, whereas neighboring pixels within the kernel that are not X-pixels apart from the target pixel are assigned zero weights. For example, the kernel 620a of FIG. 6A comprises a 3×3 window or matrix, with the target pixel Y24 in the middle and neighboring 8 pixels surrounding the target pixel. For example, neighboring pixels Y33, Y25, and Y15 are labelled in FIG. 6A. Because the stride of the kernel is 1, all pixels in the kernel 620 that are 1-pixel apart from the target pixel Y24 are shaded in FIG. 6A (in contrast, only some pixels in the kernels of FIGS. 6B and 6C are shaded), implying that all the neighboring pixels are considered with generating the kernel 620a.

To generate the kernel 620a, a final radiance feature vector F_Ri_1 (e.g., the first section of the final radiance feature vector F_Ri) is received from the module 104 for each shaded pixel of the kernel 620a. As discussed with respect to FIG. 4, the final radiance feature vector F_Ri is divided into three sections: F_Ri_1, F_Ri_2, and F_Ri_3. The first section F_Ri_1 (e.g., for pixel Y24, the section F_R24_1) of the final radiance feature vector F_Ri of a shaded pixel i is used to generate the kernel 620a. Furthermore, the final auxiliary feature vectors F_Ai of pixels, which are shaded within the kernel 620a, are also used to generate the kernel 620a. The scaling factors $a_j^1$ (which are output by the module 104 of FIG. 4) are also used to generate the kernel 620a.

Each shaded pixel within the kernel (except for the central target pixel) is assigned a corresponding weight. For example, if a central target pixel is i and another pixel within the kernel is j, then the weight of the pixel j is represented using w1(i,j). For example, for the pixel Y15, the corresponding weight is w1 (24,15); for the pixel Y33, the corresponding weight is w1(24,33), and so on. The kernel 620a, thus, comprises a plurality of weights w1(i,j) corresponding to a plurality of pixels. The number "1" after "w" in the weight implies that these are the weights for a first de-noising stage (or count k=1), as will be discussed in turn.

In some embodiments, the kernel generation module 112 of the systems 102 and/or 202 (illustrated in FIGS. 1 and 2)

generates the kernel weights w1(i, j), as follows, using the pairs of per pixel final radiance and auxiliary feature vectors:

$$w1(i,j) = a_j^1 \cdot e^{-\|F\_Ri\_1 - F\_Rj\_1\|^2 \|(F\_Ai - F\_Aj)\|^2} \quad \text{Equation 7}$$

In equation 7, the term e is the Euler's number, which is a mathematical constant approximately equal to 2.71828, and the operator $\|\ldots\|^2$ outputs the L2 norm or distance. For example, the term $\|F\_Ri\_1 - F\_Rj\_1\|^2$ within the exponent is a L2 norm or L2 distance between the first section of the final radiance feature vector F_Ri of pixel i and the first section of the final radiance feature vector F_Rj of pixel j. For example, for the weight w1(24,33) corresponding to the pixel Y33, this term would be $\|(F\_R24\_1 - F\_R33\_1)\|^2$.

Similarly, in equation 7, the term $\|(F\_Ai - F\_Aj)\|^2$ within the exponent is a L2 norm or L2 distance between the final auxiliary feature vector F_Ai of the pixel i and the final auxiliary feature vector F_Aj of the pixel j. For example, for the weight w1(24,33) corresponding to the pixel Y33, this term would be $\|(F\_A24 - F\_A33)\|^2$.

Note that in equation 7, the terms within the exponent are symmetric, i.e., contribution of pixel i to pixel j and contribution of pixel j to pixel i would be the same. Thus, without the scaling factor $a_j^1$, the weights w1(i, j) and w1 (j, i) would be the same.

For example, assume that the pixel j is a bright light source, while pixel i is not a light source. In such an example, the first section of corresponding final radiance feature vectors F_Ri_1 and F_Rj_1 would be drastically different. Thus, in some such instances, pixel j is an outlier, e.g., where pixel j with high energy radiance creates spike noise. Thus, the final radiance feature vector of this pixel tends to be far away from final radiance feature vectors of regular neighboring pixels in learned feature space. This would result in a high value of the exponent term $\|(F\_Ai - F\_Aj)\|^2$, which would result in almost zero value for the weights w1(i,j) and w1(j,i) (e.g., assuming that the scaling factor $a_j^1$ is not used). Put differently, if the scaling factor $a_j^1$ is not used, an outlier pixel would not have a chance to get radiance contributions from its neighbors, because the corresponding weight would be very near to zero.

Thus, in some embodiments, the scaling factor $a_j^1$ is used to break the symmetrical relationship between weights w1(i, j) and w1(j,i). The scaling factor $a_j^1$ can be a measurement of how reliable the pixel aj is for its neighboring pixels. For outlier pixels, such as pixels that are light sources or high radiance pixels (e.g., having radiance value higher than a threshold) while neighboring pixels are low-radiance pixels, the scaling factor $a_j^1$ is made low. For example, assume that pixel Y33 is an outlier pixel that is a high-radiance pixel (e.g., having radiance value higher than a threshold), while neighboring pixel Y24 is a low-radiance pixel (e.g., having radiance value lower than the threshold). The scaling factor $a_{33}^1$ is assigned a low value by the module 411, while the scaling factor $a_{24}^1$ is assigned a regular, somewhat high value by the module 411. Now, because the scaling factor $a_{33}^1$ is low, the weight w1(24,33), which uses the scaling factor $a_{33}^1$ in its calculation, is low or almost zero. However, because the scaling factor $a_{24}^1$ is not low, the weight w1(33, 24), which uses the scaling factor $a_{24}^1$ in its calculation, is not too low. That is, the weight w1(33,24) is higher than the weight w1(24,33) (e.g., where w1(24,33) is almost zero) due to the differences in the scaling factors $a_{33}^1$ and $a_{24}^1$. Thus, the outlier pixel Y33 is receiving non-zero contributions from the regular pixel Y24, but the outlier pixel Y33 is substantially unable to contribute to the neighboring regular pixel Y24. Without the scaling factor $a_j^1$, the weights w1(33, 24) and w1(24,33) would have been symmetrical.

Thus, as discussed, referring again to equation 7, the weight w1 (i, j) can be thought as a factor or weight which dictates how much radiance of the pixel j will contribute to a radiance of the pixel i, while de-noising the noisy image. Because the noisy image has few sampling points (e.g., 8 SPP), such weights and cross-influence of radiance attributes among neighboring pixels increase effective number of sampling points, thereby decreasing the noise in the image. The contribution of pixel j to the pixel i will be via convolution of the kernel 620a with the noisy image, as will be discussed with respect to FIG. 7A herein in turn.

Thus, as discussed, the kernel 620a is generated by calculating weights w1(i,j) for each shaded pixel j within the kernel, where i is the central pixel of the kernel 620a, which is the target pixel. For the central pixel, no weight is calculated, as weight w1(i,i) will simply have a value of $a_i$.

Figures 7B, 7C:
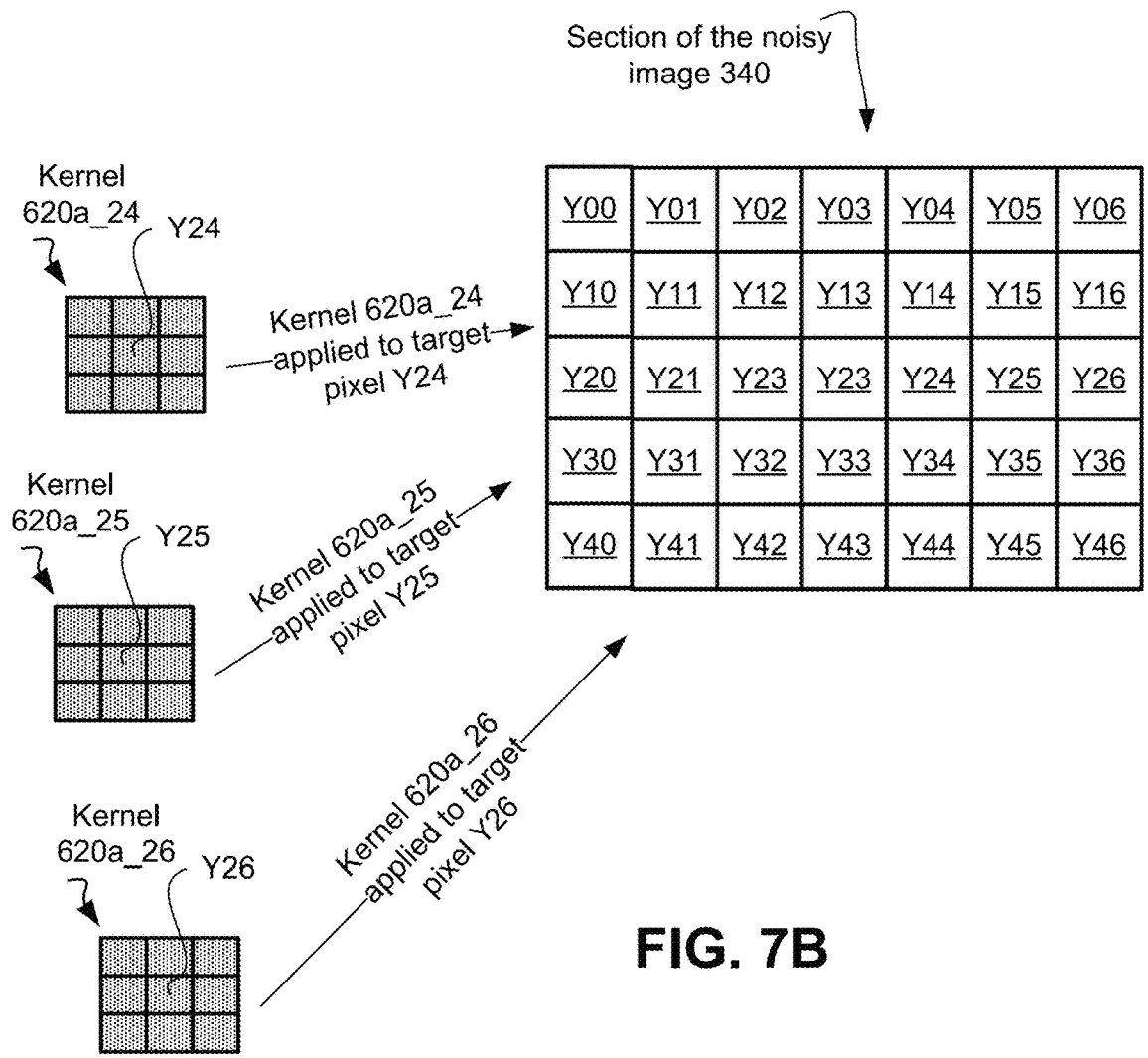
FIG. 7B illustrates an example convolution operation between a subset of kernels and a noisy image, in accordance with some embodiments of the present disclosure.
FIG. 7C illustrates example pseudocode summarizing operations illustrated in FIGS. 7A and 7B, in accordance with some embodiments of the present disclosure.

Note that the kernel 620a is calculated for the target pixel i, which in this example is specifically the pixel Y24. The kernel 620a is repeatedly calculated, with other pixels acting as target pixel, e.g., as illustrated in FIG. 7B. For example, another kernel is generated in a similar manner, with pixel Y25 as a target pixel positioned in a center of this kernel. Furthermore, yet another kernel is generated in a similar manner, with pixel Y33 as a target pixel positioned in a center of this kernel. This process continues, until 3×3 kernels for all target pixels of the image to be rendered have been generated. Thus, a subset of kernels having stride $2^0$ or 1 are generated, where a target pixel of each kernel is a corresponding pixel in the image. FIG. 7B illustrates examples of 3 such kernels in the subset of kernels having the stride of 1. These kernels are used for convolution operations, as will be discussed with respect to FIG. 7A herein later.

Referring now to FIG. 6B, this figure illustrates generation of a kernel 620b for a target pixel Y24 of FIG. 3C. For example, the kernel 620b is of stride $2^1=2$. Thus, each pixel that is 2 pixels apart from the target pixel Y24 is considered (e.g., is shaded and has non-zero weight) while generating the kernel 620a. Pixels that are not 2-pixels apart form the target pixel are not shaded, implying that these pixels are assigned zero weights.

The kernel 620b of FIG. 6B comprises a 5×5 window or matrix, with the target pixel Y24 in the middle and neighboring 24 pixels surrounding the target pixel. For example, neighboring pixels Y33 and Y26 are labelled in FIG. 6B. Pixels that are two pixel apart from the target pixel Y24 are shaded in FIG. 6B, implying that only the shaded pixels contribute to the target pixel Y24 that is in the center of the kernel.

Each shaded pixel within the kernel (except for the central target pixel) has a corresponding weight. For example, if a central target pixel is i and another pixel within the kernel is j, then the weight of the pixel j is represented using w2(i,j). For example, for the shaded pixel Y26, the corresponding weight is w2(24,26); whereas for the non-shaded pixel Y33, no corresponding weight is calculated. The kernel 620b, thus, comprises a plurality of weights w2(i,j) corresponding to a plurality of shaded pixels. The number "2" after "w" in the weight implies that these are the weights for a second de-noising stage (or count k=2), as will be discussed in turn.

In some embodiments, the kernel generation module 112 of the systems 102 and/or 202 (illustrated in FIGS. 1 and 2) generates the kernel weights w2(i, j), as follows, using the pairs of per pixel final radiance and auxiliary feature vectors:

$$w2(i,j) = a_j^2 \cdot e^{\|(F\_Ri\_2 - F\_R\_j\_2)\|^2 - \|(F\_Ai - F\_Aj)\|^2} \quad \text{Equation 8}$$

As can be seen, equation 8 is similar to equation 7. However, unlike equation 7 that uses the first section of the final radiance feature vector (e.g., F_Ri_1), equation 8 uses the second section of the final radiance feature vector (e.g., F_Ri_2) generated by the module 104 of FIG. 4. Furthermore, unlike equation 7 that uses the scaling factor $a_j^1$, equation 8 uses scaling factor $a_j^2$. In some embodiments, both the scaling factors $a_j^1$ and $a_j^2$ for the pixel j have the same value, whereas in some other embodiments these scaling factors are different. As discussed, the scaling factors $a_j^1$ and $a_j^2$ are generated by the trained neural network module 411 of FIG. 4. As will be appreciated, the discussion with respect to equation 7 is equally applicable to equation 8.

Thus, the kernel 620b is generated by calculating weights w2(i, j) for each shaded pixel j within the kernel, where i is the central pixel of the kernel 620b, which is the target pixel. Note that the kernel 620b is calculated for the target pixel i, which in this example is specifically the pixel Y24. The kernel 620b is repeatedly calculated, with other pixels acting as target pixel. For example, another kernel is generated in a similar manner, with pixel Y25 as a target pixel positioned in a center of this kernel. Furthermore, yet another kernel is generated in a similar manner, with pixel Y33 as a target pixel positioned in a center of this kernel. This process continues, until 5×5 kernels for all pixels of the image to be rendered have been generated. Thus, a subset of kernels having stride $2^1$ or 2 are generated, where a target pixel of each kernel is a corresponding pixel in the image. These kernels are used for convolution operations, as will be discussed with respect to FIG. 7A herein later.

Referring now to FIG. 6C, this figure illustrates generation of a kernel 620c for a target pixel Y24 of FIG. 3C. For example, the kernel 620c is of stride $2^2$=4. Thus, each pixel that is 4 pixels apart from the target pixel Y24 is considered while generating the kernel 620c. Note that each of the kernels 620a, 620b, 620c of FIGS. 6A-6C, respectively, are generated for the same target pixel Y24.

The kernel 620c of FIG. 6C FIG. 6B comprises a 9×9 window or matrix, with the target pixel in the middle and neighboring 80 pixels surrounding the target pixel. For example, neighboring pixels Y14 and Y24 are labelled in FIG. 6C. Pixels that are four pixels apart from the target pixel Y24 are shaded in FIG. 6C, implying that only the shaded pixels contribute to the target pixel Y24 that is in the center of the kernel 620c.

Each shaded pixel within the kernel 620c (except for the central target pixel) has a corresponding non-zero weight. For example, if a central target pixel is i and another pixel within the kernel is j, then the weight of the pixel j is represented using w3(i, j). For example, for the shaded pixel Y20, the corresponding weight is w3(24, 20); whereas for the non-shaded pixel Y14, no corresponding weight is calculated. The kernel 620c, thus, comprises a plurality of weights w3(i, j) corresponding to a plurality of shaded pixels. The number "3" after "w" in the weight implies that these are the weights for a third de-noising stage (or count k=3), as will be discussed in turn.

In some embodiments, the kernel generation module 112 of the systems 102 and/or 202 (illustrated in FIGS. 1 and 2) generates the kernel weights w3(i, j), as follows, using the pairs of per pixel final radiance and auxiliary feature vectors:

$$w3(i,j) = a_j^3 \cdot e^{-\|(F\_Ri\_3 - F\_Rj\_3)\|^2 - (F\_Ai - F\_Aj)\|^2} \quad \text{Equation 9}$$

As can be seen, equation 9 is similar to equation 7. However, unlike equation 7 that uses the first section of the final radiance feature vector (e.g., F_Ri_1), equation 9 uses the third section of the final radiance feature vector (e.g., F_Ri_3) generated by the module 104 of FIG. 4. Furthermore, unlike equation 7 that uses the scaling factor $a_j^1$, equation 9 uses scaling factor $a_j^3$ for the pixel j. In some embodiments, the scaling factors $a_j^1$, $a_j^2$ and $a_j^3$ for the pixel j have the same value, whereas in some other embodiments these scaling factors are different. As discussed, these scaling factors are generated by the trained neural network module 411 of FIG. 4. As will be appreciated, the discussion with respect to equations 7 and 8 is equally applicable to equation 9.

Thus, the kernel 620c is generated by calculating weights w3(i, j) for each shaded pixel j within the kernel 620c, where i is the central pixel of the kernel 620c, which is the target pixel. Note that the kernel 620c is calculated for the target pixel i, which in this example is specifically the pixel Y24. The kernel 620c is repeatedly calculated, with other pixels acting as target pixel. For example, another kernel is generated in a similar manner, with pixel Y25 as a target pixel positioned in a center of this kernel. Furthermore, yet another kernel is generated in a similar manner, with pixel Y33 as a target pixel positioned in a center of this kernel. This process continues, until 9×9 kernels for all pixels of the image to be rendered have been generated. Thus, a subset of kernels having stride $2^2$ or 4 are generated, where a target pixel of each kernel is a corresponding pixel in the image. These kernels with stride 4 are used for convolution operations, as will be discussed with respect to FIG. 7A herein later.

FIG. 7A illustrates de-noising a noisy image 340 using multiple de-noising stages, where each stage uses a subset of corresponding kernels, in accordance with some embodiments of the present disclosure. Various operations discussed with respect to FIG. 7A are performed by the reduced-noise image generation module 120 of FIGS. 1 and 2. For example, a noisy image 340 forms an input image in FIG. 7A, where a section of the noisy image 340 is also illustrated in FIGS. 3B and 7A. As discussed with respect to FIG. 3B and equations 2 and 1 a, the image 340 is a noisy image generated using Monte Carlo rendering, with, for example, 8 samples per pixel (8 SPP). For example, the noisy image generator module 116 of the system 102 (as illustrated in FIGS. 1 and 2) generates the noisy image 340. In an example, the noisy image 340 is generated in accordance with equations 2 and 1 a discussed herein previously, with 8 SPP.

As illustrated in FIG. 7A, the kernel 620a is convoluted with the noisy image 340, e.g., by the reduced-noise image generation module 120. FIG. 7B illustrates a convolution operation between a subset of kernels (e.g., kernel 620a) having stride 1 and the noisy image 340, in accordance with some embodiments of the present disclosure. For example, referring to FIGS. 7A and 7B, individual pixels of the noisy image 340 are processed using a corresponding kernel. For example, as illustrated in FIG. 7B, pixel Y24 of the image 340 is processed using a kernel 620a_24, where the kernel 620a_24 has the pixel Y24 as the central pixel or the target pixel. Similarly, pixel Y25 of the image 340 is processed using a kernel 620a_25, where the kernel 620a_25 has the pixel Y25 as the central pixel or the target pixel. Similarly, pixel Y26 of the image 340 is processed using a kernel 620a_26, where the kernel 620a_26 has the pixel Y26 as the central pixel or the target pixel. Generally speaking, a pixel of the noisy image 340 is processed with a corresponding kernel 620a_i, where the kernel 620a_i has the pixel Yi as the central pixel or the target pixel. The kernels 620a_24, 620a_25, 620a_26, and generally speaking, 620a_i are all generated similarly to the generation of the kernel 620a of FIG. 6A (e.g., the kernel 620a of FIG. 6A discusses an example of the 3×3 kernels used in FIG. 7B). The noisy image 340 is processed (e.g., convoluted, as discussed in turn with respect to equation 10 below) by the plurality of kernels 620a, to generate a first intermediate image 708. The noise in the image 708 has less noise than the image 340.

As illustrated in FIG. 7A, the image 708 is similarly convoluted by the kernels 620b, to generate a second intermediate image 712. Note that although a single representative kernel 620b is illustrated in FIG. 7A, as discussed with respect to FIG. 7B, for each target pixel of the image 708, there would be a corresponding kernel with stride 2 and having the target pixel in the center of the kernel.

Furthermore, the image 712 is similarly processed by the kernels 620c, to generate a final noise-free image 344. Note that although a single representative kernel 620c is illustrated in FIG. 7A, as discussed with respect to FIG. 7B, for each target pixel of the image 712, there would be a corresponding kernel with stride 4 and having the target pixel in the center.

Thus, the noisy image 340 is iteratively processed by the kernels 620a, 620b, 620c, to finally generate the noise-free image 344 (also illustrated in FIG. 3B). An output image of each stage in FIG. 7A has less noise than the input image of the stage. For example, the image 708 has less noise than the image 304, the image 712 has less noise than the image 708, and finally, the image 344 has less noise than the image 712. The image 344 is referred to as "noise-free," as this image has relatively less noise (or no noise at all) when compared to the images 340, 708, and 712, although the image 344 can have some residual noise. The image 340 is a noisy version and the image 344 is a photorealistic reduced-noise (or noise-free) version of a corresponding scene.

As discussed, each kernel is used in a convolution operation on an image output by a previous stage. For example, the kernel 620a is used in a convolution operation on the image 340 output by the noisy image generator module 116, to generate the first intermediate image 708. The kernel 620b is used in a convolution operation on the first intermediate image 708, to generate the second intermediate image 712. Finally, the kernel 620c is used in a convolution operation on the second intermediate image 712, to generate the final noise-free (or reduced noise) image 344.

Although three stages of the de-noising operations are illustrated in the example of FIG. 7A, in some other examples, the system 102 can be implemented with any other appropriate number of stages, such as two, four, or higher. Of course, with the change in the number of stages, the system 102 will undergo other corresponding changes, such as generating a different number of subsets of kernels, sectioning the final radiance feature vectors in a different number of sections, and so on, as will be appreciated in light of this disclosure.

The following equation discusses processing a target pixel of an image from a previous stage using corresponding kernels, to generate an output image of that stage:

$$\hat{L}i = \frac{1}{W_i} \sum_{j \in N_i} Lj \cdot wk(i, j) \quad \text{Equation 10}$$

In equation 10, the term $Lj$ refers to the radiance value of pixel j in the image from the previous stage, and the term $\hat{L}i$ refers to the radiance value of the target pixel i in the image output by the current stage. Thus, equation 10 depicts the convolution operation discussed with respect to FIG. 7A. The term $wk(i,j)$ is the weight dictating a contribution of pixel j to pixel i, where k refers to the stage-number is considered.

For example, for the first stage of FIG. 7A where the kernel 620a is used, the term $Lj$ refers to the radiance value of pixel j in the noisy image 340, and the term $\hat{L}i$ refers to the radiance value of pixel i in the image 708 output by the first stage. In the first stage, equation 10 uses weight $w1(i,j)$ computed in accordance with equation 7. In the first stage, denoising is performed at the $i^{th}$ pixel using radiance value $Lj$ of neighboring pixels from the set $Ni$. For a specific target pixel i, the set $Ni$ is a set of shaded pixels within the corresponding kernel. Thus, for the pixel Y24, the set $Ni$ for the first stage refers to all shaded pixels in the kernel 620a of FIG. 6A. That is, all the eight pixels neighboring the pixel Y24 contributes to the radiance value $\hat{L}24$ of the target pixel Y24 in the output image 708.

Similarly, for the second stage of FIG. 7A where the kernel 620b is used, the term $Lj$ refers to the radiance value of pixel j in the image 708, and the term $\hat{L}i$ refers to the radiance value of pixel i in the image 712 output by the second stage. In the second stage, equation 10 uses weight $w2(i,j)$ computed in accordance with equation 8. In the second stage, denoising is performed at the $i^{th}$ pixel using radiance value $Lj$ of neighboring pixels from the set $Ni$. For example, for a specific target pixel, such as the pixel Y24, the set $Ni$ for the second stage refers to all shaded pixels in the kernel 620b of FIG. 6B. For example, for the second stage and for the target pixel Y24, the set $Ni$ includes shaded pixel Y26 but excludes non-shaded pixel Y33, as illustrated in FIG. 6B. That is, the eight shaded pixels in the kernel 620b of FIG. 6B, which are 2 pixels apart from the pixel Y24, contribute to the radiance value $\hat{L}24$ of the target pixel Y24 in the output image 712. Thus, for example, shaded pixel Y26 contributes to the radiance value $\hat{L}24$ of the target pixel Y24 in the output image 712, while non-shaded pixel Y33 does not contribute to the radiance value $\hat{L}24$ of the target pixel Y24 in the output image 712.

Similarly, for the third or last stage of FIG. 7A where the kernel 620c is used, the term $1j$ refers to the radiance value of pixel j in the image 712, and the term $\hat{L}i$ refers to the radiance value of pixel i in the image 344 output by the third stage. In the third stage, equation 10 uses weight $w3(i, j)$ computed in accordance with equation 9. Furthermore, for a specific target pixel, such as the pixel Y24, the set $Ni$ for the third stage refers to all shaded pixels in the kernel 620c of FIG. 6C. For example, for the third stage and for the target pixel Y24, the set $Ni$ includes shaded pixel Y20 but excludes non-shaded pixel Y14, as illustrated in FIG. 6C. Thus, for example, shaded pixel Y20 contributes to the radiance value $\hat{L}24$ of the target pixel Y24 in the output image 344, while non-shaded pixel Y14 does not contribute to the radiance value $\hat{L}24$ of the target pixel Y24 in the output image 344.

In equation 10, the term $$\frac{1}{W_i}$$

is used for normalization. In an example, $W_i$ is calculated as follows:

$$W_i = \sum_{j \in N_i} wk(i,j) \quad \text{Equation 11}$$

Thus, for a given target pixel i, the term $W_i$ is a sum of all the weight $wk(i,j)$ used in equation 10.

FIG. 7C illustrates pseudocodes 790 summarizing the operations illustrated in FIG. 7A, in accordance with some embodiments of the present disclosure. For example, in FIG. 7C, the $\hat{L}^1$ is initialized to L, which are the light or radiance values of pixels of the noisy image 340. The stage count k=1. The pseudocodes 790 then proceeds to step 2, where weights wk(i,j) are computed. During the first iteration, wk(i,j) is w1(i,j) calculated in accordance with equation 7. At step 3, equation 10 is applied with kernels having stride $2^{k-1}$ (e.g., $2^0$ or 1 for the first iteration of the pseudocodes 790) on $\hat{L}^1$, to generate $\hat{L}^2$, where $\hat{L}^2$ is the image 708 of FIG. 7A. At the fourth step, if the count k is less than the total number of stages K (where K is 3 in the example of FIG. 7A), the count k is incremented and the operations loop back to step 2. Once operations for all three stages are complete, the final output is $\hat{L}^4$, which is the final noise-free image 344.

Figure 8A:
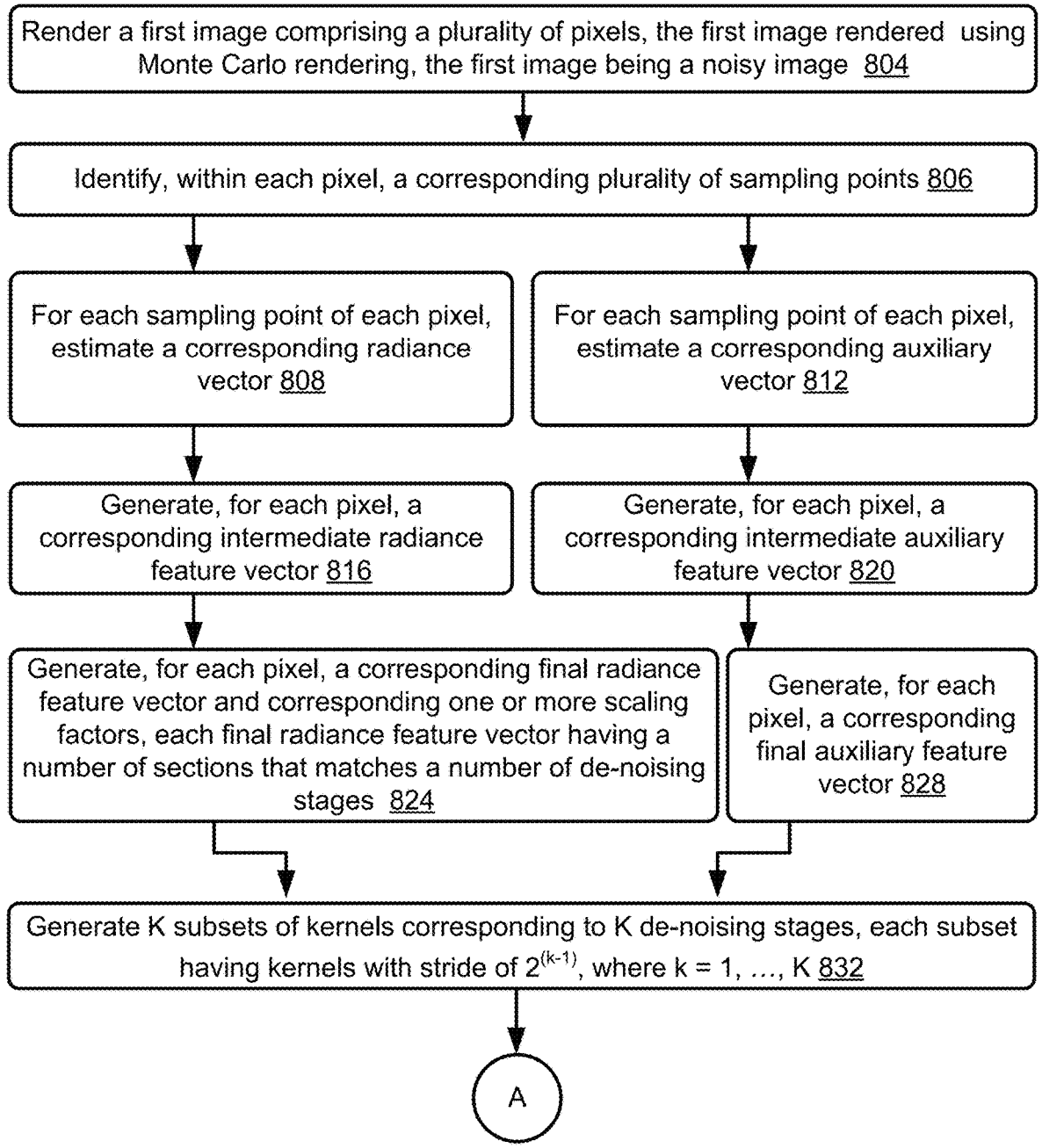
FIGS. 8A and 8B are flowcharts collectively illustrating an example methodology for de-noising a noisy image generated using Monte Carlo rendering, such that the de-noised image has less noise and is more photo-realistic than the noisy image, in accordance with some embodiments of the present disclosure.
Figure 8B:
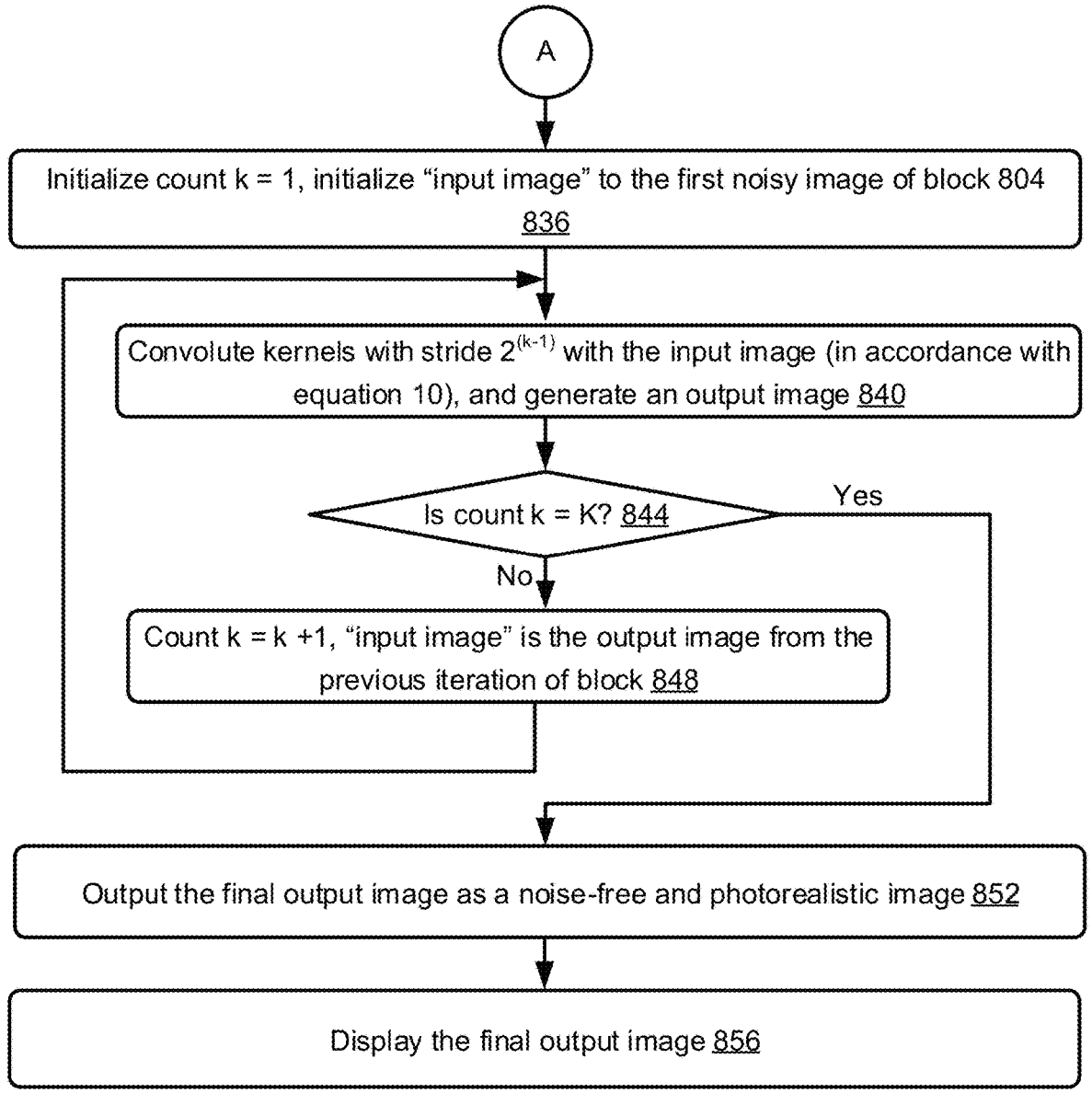

FIGS. 8A and 8B are flowcharts collectively illustrating an example methodology 800 for de-noising a noisy image generated using Monte Carlo rendering, such that the de-noised image has less noise and is more photo-realistic than the noisy image, in accordance with some embodiments of the present disclosure. Method 800 can be implemented, for example, using the system architecture illustrated in FIGS. 1 and/or 2, and described herein. However other system architectures can be used in other embodiments, as apparent in light of this disclosure. To this end, the correlation of the various functions shown in FIG. 3A to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. Although various operations of the method 800 are discussed herein as being performed by the image de-noising system 102 of the computing device 100, one or more of these operations can also be performed by the image de-noising system 202 of the server 201 as well.

Referring to FIG. 8, the method 800 comprises, at 804, rendering a first image comprising a plurality of pixels, e.g., by the noisy image generator module 116 (as illustrated in FIGS. 1 and 2). In some examples, the first image is rendered using the Monte Carlo methodology, e.g., using above discussed equations 2 and 1a. An example of the first image is the noisy image 340 of FIG. 3B. The first image, in some examples, is of a synthetic model or scene generated digitally.

The Monte Carlo methodology aims to render the synthetic scene, to generate a realistic image from the synthetic scene using a scene file. For example, the Monte Carlo methodology aims to generate a photorealistic image of the scene, by attributing desired radiance or light levels to individual pixels of the synthetic scene. However, the Monte Carlo rendering uses a lower number of SPP, such as 4, 8, 12, or another appropriate number which is less than, for example, 24, 48, 96, 128 or 256. The Monte Carlo rendering uses the lower number of SPP, e.g., due to limited computational budget and/or in order to save time for such computation. For example, the noisy image 340 of FIG. 3B is generated using 8 SPP Monte Carlo rendering. Accordingly, as the Monte Carlo rendering uses a lower number of SPP, the resultant image is noisy and is far from being photorealistic. Various operations of the method 800 aim to reduce the noise in this noisy image that is generated using the lower SPP Monte Carlo rendering.

The method 800 then proceeds from 804 to 806. At 806, within each pixel, a corresponding plurality of sampling points is identified. For example, FIG. 3C illustrates example sampling points S_1_24, S_2_24, . . . , S_8_24 within the example pixel Y24, and example sampling points S_1_42, S_2_42, . . . , S_8_ 42 within the example pixel Y42. For the example of FIG. 3C, 8 sampling points per pixel or 8 SPP are considered, although any other number of sampling points can be considered. In some examples, the sampling points identified at 806 can be the same sampling points used to generate the noisy first image using the Monte Carlo rendering at 804. Thus, in some such examples, the operations at block 806 can be a subset of operations at block 804, and operations of blocks 804 and 806 can be combined.

The method 800 then proceeds into two different branches. For example, following the first branch, the method 800 proceeds from 806 to 808, at which, for each sampling point of each pixel, a corresponding radiance vector is estimated (e.g., by the feature identification module 103 illustrated in FIGS. 1 and 2). For example, the radiance vectors are provided as input to the radiance feature vector generation module 104 of FIG. 4. Equation 3 herein above discusses estimation of radiance vectors for individual sampling points.

The method 800 then proceeds from 808 to 816. At 816, for each pixel, a corresponding intermediate radiance feature vector is generated, e.g., by the radiance feature vector generation module 104 of FIG. 4. For example, the neural network module 410, also referred to as a sample embedding stage, receives the radiance vectors per-sampling point, and generates an intermediate radiance feature vector per pixel. For example, the module 410 is trained to identify how a plurality of radiance vectors 414 corresponding to various sampling points of a specific pixel is to be processed and averaged, to generate the corresponding intermediate radiance feature vector 418 for that specific pixel. Merely as an example, the module 410 detects patterns in the radiance vectors, and determines a manner in which the radiance vectors are to be combined or averaged to form the intermediate radiance feature vector 418, as discussed with respect to FIG. 4.

The method 800 then proceeds from 816 to 824. At 824, for each pixel, a corresponding final radiance feature vector and corresponding one or more scaling factors are generated, e.g., by the radiance feature vector generation module 104 of FIG. 4. In some embodiments and as discussed with respect to FIG. 4, each final radiance feature vector has a number of sections that matches a number of de-noising stages. For example, in the example of FIG. 7A, three stages are used, and hence, for this example, each final radiance feature vector has 3 sections. For example, the final radiance feature vector F_R24 for the example pixel Y24 has three sections F_R24_1, F_R24_2, and F_R24_3.

In some embodiments, for each pixel, a single scaling factor $a_j$ is generated. In some other embodiments, for individual pixel i, three corresponding scaling factors $a_i^1$, $a_i^2$, and $a_i^3$ are generated, as illustrated in FIG. 4. For example, the neural network module 411, also referred to as a spatial propagation stage, receives the intermediate radiance feature vectors, and generates the final radiance feature vectors and scaling factors, as discussed previously with respect to FIG. 4. As also discussed with respect to FIG. 4, the module 411 spatially propagates radiance attributes of a first pixel to one or more neighboring pixels, e.g., if the first pixel and one or more neighboring pixels have some similar radiance attributes and/or are on a same or similar section of the image, and generates the final radiance feature vectors of the pixels accordingly.

Referring again to FIG. 8A, the method 800 also has a second branch from block 806, and in this second branch, the method 800 proceeds from 806 to 812. At 812, for each sampling point of each pixel, a corresponding auxiliary vector is estimated (e.g., by the feature identification module 103 illustrated in FIGS. 1 and 2). For example, the auxiliary vectors are provided as input to the auxiliary feature vector generation module 108 of FIG. 5. Equation 4 herein above discusses estimation of auxiliary vectors for individual sampling points.

The method 800 then proceeds from 812 to 820, where for each pixel, a corresponding intermediate auxiliary feature vector is generated, e.g., by the auxiliary feature vector generation module 108 of FIG. 5. For example, the neural network module 510, also referred to as a sample embedding stage, receives the auxiliary vectors per-sampling point, and generates an intermediate auxiliary feature vector 518 per pixel. For example, the module 510 is trained to identify how a plurality of auxiliary vectors 514 of various sampling points of a specific pixel is to be processed and averaged, to generate the intermediate auxiliary feature vector 518 for that specific pixel. Merely as an example, the module 510 detects patterns in the auxiliary vectors, and determines a manner in which the auxiliary vectors are to be combined or averaged to form the intermediate auxiliary feature vectors 518.

The method 800 then proceeds from 820 to 828, where, for each pixel, a corresponding final auxiliary feature vector is generated, e.g., by the auxiliary feature vector generation module 108 of FIG. 5. In some embodiments and as discussed with respect to FIG. 5, the neural network module 511, also referred to as a spatial propagation stage, receives the intermediate auxiliary feature vectors, and generates the final auxiliary feature vectors. As also discussed with respect to FIG. 5, the module 511 spatially propagates auxiliary attributes of a first pixel to one or more neighboring pixels, e.g., if the first pixel and one or more neighboring pixels have some similar auxiliary attributes and/or are on a same or similar section of the image, and generates the final auxiliary feature vectors of the pixels accordingly.

The method 800 then proceeds from 824 and 828 to 832. At 832, the system 102 (e.g., the kernel generation module 112 illustrated in FIGS. 1 and 2) generates K subsets of kernels corresponding to K number of de-noising stages. In an example, each subset has kernels with stride of $2^{(k-1)}$, where k=1, ..., K.

Thus, in the examples of FIGS. 6A, 6B, 6C, and 7A, the number of stages is 3 (e.g., K=3), and hence, 3 subsets of kernels are generated. For example, the first subset of kernels is generated with k=1, and stride $2^{(1-1)}$, which is $2^0$, or 1. FIG. 6A illustrates an example kernel of the first subset of kernels, and FIG. 7B illustrates further example kernels of the first subset of kernels. For example, for each target pixel of the noisy image, a corresponding kernel of the first subset of kernels is generated, as discussed with respect to FIG. 7B. Equation 7 discusses generation of weights for the kernels of the first subset of kernels. Generation of the kernels of the first subset involve generation of the underlying weights w1(i, j) that dictate contribution of radiance from a pixel j to a target pixel i.

The second subset of kernels are generated with k=2, and stride $2^{(2-1)}$, which is $2^1$ or 2. FIG. 6B illustrates an example kernel of the second subset of kernels, where pixels that are two pixels apart from the target pixel are shaded and weighted (the white pixels in the kernel 620b have has zero weightage). For example, for each pixel of the noisy image, a corresponding kernel of the second subset of kernels is generated. Equation 8 discusses generation of weights for the kernels of the second subset of kernels. Generation of the kernels involve generation of the underlying weights w2(i, j) that dictate contribution of radiance from pixel j to pixel i.

The third subset of kernels are generated with k=3, and stride $2^{(3-1)}$, which is $2^2$ or 4. FIG. 6C illustrates an example kernel of the third subset of kernels, where pixels that are four pixels apart from the target pixel are shaded and weighted (the white pixels in the kernel 620c have zero weightage). For example, for each pixel of the noisy image, a corresponding kernel of the third subset of kernels is generated. Equation 9 discusses generation of weights for the kernels of the third subset of kernels. Generation of the kernels involve generation of the underlying weights w3(i, j) that dictate contribution of radiance from pixel j to pixel i.

The method 800 then proceeds from 832 in FIG. 8A to 836 in FIG. 8B. Operations discussed with respect to blocks 836 to 852 of the method 800 of FIG. 8B are also illustrated in FIG. 7A and briefly discussed with respect to the pseudo-codes 790 of FIG. 7C. Specifically, at 836, a count k is initialized to 1, and the first noisy image of block 804 is initialized as an input image (e.g., by the reduced noise image generation module 120 of FIGS. 1 and 2).

The method 800 then proceeds from 836 to 840. For example, at 840, kernels with stride $2^{(k-1)}$ are convoluted with the input image, e.g., in accordance with equation 10, to generate an output image. The first iteration of the method 800 is for a first stage of the de-noising pipeline illustrated in FIG. 7A. For example, for k=1, kernels with stride $2^0=1$ are convoluted. Examples of kernels with stride 1 are the kernels 620a, 620a_24, 620a_25, and 620a_26 illustrated in FIGS. 6A, 7A, and 7B. FIG. 7A illustrates convolution with the kernels with stride 1 with the input image (which is the noisy image 340), to generate the first intermediate image 708. The convolution operation is discussed with respect to equation 10, with weights w1 (i, j) being used in the first stage, where the number "1" after "w" implies that these are the weights for the first stage (or count k=1).

The method then proceeds to 844, during which the reduced noise image generation module 120 checks to see if the count k is equal to K, where K is the number of stages in the de-noising pipeline of FIG. 7A.

If "No" at 844, this implies that there are subsequent stages of the de-noising pipeline remaining to be executed. Accordingly, the method 800 proceeds to 848, from which it loops back to 840. At 848, the count k is incremented by one, and the output image from 840 is now set as the input image. In the context of FIG. 7A, the first intermediate image 708 output by the first stage is now set as the input image. The method then loops back to 840. During the second iteration of 840, the count k=2. Hence, kernels with stride $2^1$ or 2 are used, such as the example kernel 620b of FIGS. 6B and 7A. FIG. 7A illustrates convolution of the kernels 620b having stride 2 with the input image (which is the first intermediate image 708), to generate the second intermediate image 712. The convolution operation is discussed with respect to equation 10, with weights w2(i,j) being used, where the number "2" after "w" implies that these are the weights for the second stage (or count k=2).

The method 800 then proceeds from 840 to 844. As there are three stages (e.g., K is 3) in the example of FIG. 7A discussed herein, the operations at 848 and 840 are repeated once more for the third stage. During the third stage, the count k=3. Hence, kernels with stride $2^2$ or 4 are used, such as the example kernel 620c of FIGS. 6C and 7A. FIG. 7A illustrates convolution of the kernels 620c having stride 4 with the input image (which is the second intermediate image 712), to generate the noise-free image 344. The convolution operation is discussed with respect to equation 10, with weights w3(i, j) being used, where the number "3" after "w" implies that these are the weights for the third stage (or count k=3).

The method 800 then proceeds to 844 for the third time. During this iteration, count k is 3, which is equal to the number of stages K in some instances, for example, the instance of FIG. 7A. Hence, the decision block 844 outputs an "Yes" and the method 800 proceeds to 852, where the system 102 (or the system 202) outputs the final output image (e.g., the image 344) as a noise-free (or noise-reduced) and photorealistic image. At 856, the final output image is displayed on a display screen, such as the display 142 of FIGS. 1 and 2.

Thus, an output image of each stage in the method 800 has less noise than the output image of the previous stage. For example, referring to FIG. 7, the image 708 has less noise than the image 340, the image 712 has less noise than the image 708, and finally, the image 344 has less noise than the image 712. The image 344 is referred to as "noise-free," as this image has relatively less noise (or no noise at all) when compared to the images 340, 708, and 712, although the image 344 can have some residual noise. The image 340 is a noisy version and the image 344 is a photorealistic reduced-noise (or noise-free) version of the scene.

As discussed, in some embodiments, in order to have large enough spatial context for the kernels, instead of using a single stage with a single fixed-sized kernel, multiple stages with multiple kernels having corresponding strides are used in the method 800. Note that although kernel 620c of FIG. 6C is larger than the kernel 620b of FIG. 6B, which is larger than kernel 620a of FIG. 6A, in each of the kernels 620a, 620b, 620c, only eight pixels neighboring the target pixel are shaded. Thus, although the spatial context of the kernel increases with the stage, the computation does not increase proportionally, the same number of weights are to be calculated per kernel, irrespective of the stage in which the kernel is used. Thus, in some embodiments, the denoising discussed with respect to FIG. 7A can be performed at an interactive frame-rate. For example, the denoising is fast, as not all pixels within each kernel are considered. For example, radiance values of only shaded pixels in the kernels, as discussed with respect to FIGS. 6B and 6C, contribute to the corresponding target pixel.

Furthermore, radiance and auxiliary feature attributes for multiple sampling points are intelligently averaged, to generate averages per pixels, e.g., by the averaging modules 436 and 536 of FIGS. 4 and 5, respectively. Thus, whenever attributes of new sampling points are available, the average is updated, to get refined images, making the de-nosing process fast and achieving interactive frame-rate for the de-noising process.

As discussed, the scaling factor $a_j$ in equations 7, 8, and 9 contributes to asymmetry in radiance value contribution. Accordingly, an outlier pixel can receive radiance contributions from neighboring pixels, while not substantially contributing radiance to the neighboring pixels. A pixel is an outlier pixel if the pixel is a source of light, e.g., the outlier pixel emits substantial radiance (e.g., is a light source) compared to one or more neighboring pixels.

Furthermore, the system 102 utilizes deep learning to cast denoising as a supervised learning problem. Given the noisy input image 340, the neural networks illustrated in FIGS. 4 and 5 predict feature vectors per pixel, by analyzing each pixel in its spatial proximity. When determining how much radiance a pixel should contribute to another pixel, the system 102 explicitly calculates the distances between feature vectors of these pixels, as discussed with respect to equations 7, 8, and 9. Thus, the system 102 makes it possible to use low capacity networks with lower computational cost, which leads to the de-noising operations illustrated in FIG. 7A run at interactive frame-rates. Thus, the system 102 can generate substantial noise-free images (such as the image 344), even though the system 102 uses only a fraction of parameters used by conventional de-noising systems.

Numerous variations and configurations will be apparent in light of this disclosure and the following examples.

Example 1. A method for de-noising an image, the method comprising: identifying, within individual pixels of a set of pixels of a first image, a corresponding plurality of sampling points; for individual sampling points, estimating a corresponding radiance vector characterizing light received at the corresponding sampling point; generating, by a first machine learning module, for individual pixels in the set, a corresponding intermediate radiance feature vector, based at least in part on the radiance vectors associated with the corresponding plurality of sampling points within the corresponding pixel; generating, by a second machine learning module, for individual pixels in the set, a corresponding final radiance feature vector, based at least in part on intermediate radiance feature vectors for the corresponding pixel and one or more neighboring pixels; and generating a second image, based at least in part on the final radiance feature vectors, wherein the second image has less noise and is more photo-realistic than the first image.

Example 2. The method of example 1, wherein: generating the final radiance feature vectors comprises generating, for each pixel of the set, a corresponding final radiance feature vector that has at least a corresponding first section and a corresponding second section; and the method further comprises generating a first subset of kernels having a first stride, based at least in part on the first sections of the final radiance feature vectors, and generating a second subset of kernels having a second stride, based at least in part on the second sections of the final radiance feature vectors.

Example 3. The method of example 2, wherein generating the first subset of kernels comprises: generating a first kernel of the first subset of kernels, the first kernel including a first pixel as a target pixel and a plurality of pixels neighboring the target pixel, wherein the first kernel has a stride of X, indicating that pixels that are X-pixels apart from the target first pixel within the first kernel are assigned non-zero weights, X being a positive integer, a second pixel within the first kernel being X-pixels apart from the target first pixel, and wherein a first weight, which dictates a contribution of radiance value from the second pixel to the first pixel, is calculated based at least in part on a distance between (i) the first section of the first final radiance feature vector for the first pixel and (ii) the first section of the second final radiance feature vector for the second pixel.

Example 4. The method of example 3, further comprising: generating, by the second machine learning module, for individual pixels in the set, a corresponding scaling factor, wherein generating the first kernel comprises generating the first weight, based at least in part on a scaling factor assigned to the second pixel; and generating a second weight for a second kernel, based at least in part on (i) the distance, and (ii) a scaling factor assigned to the first pixel, the second weight dictating a contribution of radiance value from the first pixel to the second pixel; wherein the first weight is different from the second weight, based at least in part on the scaling factor assigned to the first pixel being different from the scaling factor assigned to the second pixel.

Example 5. The method of example 4, further comprising: assigning, by the second machine learning module, different values to the scaling factors of the first and second pixels, in response to a detection that one of the first or the second pixel has a radiance value higher than a threshold, and another one of the first or the second pixel has a radiance value lower than the threshold.

Example 6. The method of any of examples 2-5, wherein generating the second image comprises: convoluting the first subset of kernels with the first image, to generate a first intermediate image; convoluting the second subset of kernels with the first intermediate image, to generate a second intermediate image; and convoluting a third subset of kernels with the second intermediate image, to generate the second image.

Example 7. The method of example 6, wherein: each of the first subset of kernels has a first stride having a value of 1, such that a plurality of neighboring pixels that are 1-pixel apart from a target pixel in a kernel of the first subset are assigned corresponding non-zero weights; each of the second subset of kernels has a second stride having a value of 2, such that a plurality of neighboring pixels that are 2-pixels apart from a target pixel in a kernel of the second subset are assigned corresponding non-zero weights; and each of the third subset of kernels has a third stride having a value of 4, such that a plurality of neighboring pixels that are 4-pixels apart from a target pixel in a kernel of the third subset are assigned corresponding non-zero weights.

Example 8. The method of any of examples 1-7, wherein one or more radiance values characterizing light received at a first sampling point comprises one or more of: Red, Green, and Blue (R, G, B) color values of light representing direct illumination and diffuse reflection at the first sampling point; R, G, B color values of light representing direct illumination and specular reflection at the first sampling point; R, G, B color values of light representing indirect illumination and diffuse reflection at the first sampling point; and/or R, G, B color values of light representing indirect illumination and specular reflection at the first sampling point.

Example 9. The method of any of examples 1-8, wherein prior to estimating the radiance vectors, the method further comprises: rendering the first image with Monte Carlo methodology, using a plurality of sampling points per pixel.

Example 10. The method of any of examples 1-9, further comprising: for individual sampling points of individual pixels, estimating a corresponding auxiliary vector that includes one or more auxiliary features characterizing a surface of the corresponding sampling point; generating, by a third machine learning module, for individual pixels, a corresponding intermediate auxiliary feature vector, based at least in part on the auxiliary vectors associated with the corresponding plurality of sampling points within the corresponding pixel; and generating, by a fourth machine learning module, for individual pixels, a corresponding final auxiliary feature vector, wherein a first final auxiliary feature vector for the first pixel is generated based at least in part on (a) a first intermediate auxiliary feature vector for the first pixel, and (b) one or more other intermediate auxiliary feature vectors for one or more other pixels neighboring the first pixel.

Example 11. The method of example 10, further comprising: generating one or more subsets of kernels based at least in part on the final auxiliary feature vectors, wherein the one or more subsets of kernels are usable to generate the second image.

Example 12. The method of example 11, wherein generating the one or more subsets of kernels comprises: identifying a second pixel neighboring a first pixel; and calculating a first weight, based at least in part on (i) a first L2 norm between a first final radiance feature vector for the first pixel and a second final radiance feature vector for the second pixel, and (ii) a second L2 norm between the first final auxiliary feature vector for the first pixel and a second final auxiliary feature vector for the second pixel.

Example 13. The method of example 12, further comprising: generating a kernel having a stride of X and having the first pixel as a central pixel, such that a plurality of neighboring pixels that are X-pixels apart from the central pixel in the kernel are assigned corresponding non-zero weights, wherein X is a positive integer, wherein the second pixel is X-pixels apart from the central pixel, and wherein the second pixel is assigned the first weight.

Example 14. The method of any of examples 10-13, wherein the one or more auxiliary features of a first sampling point comprises one or more of: coordinates representing a direction that is normal to a surface of the first sampling point; Red, Green, and Blue (R, G, B) color values representing an albedo feature of the first sampling point; a depth of the first sampling point relative to a virtual camera capturing the first image; coordinates representing a position of the first sampling point relative to a coordinate system of the virtual camera; and/or values representing an emissive property, a metallic property, a transmission property, and/or a roughness property of the first sampling point.

Example 15. A system for rendering a lower noise image from an original image comprising a plurality of pixels, the system comprising: one or more processors; a de-noising system executable by the one or more processors to generate, for individual pixels of a set of pixels of the original image, a corresponding radiance feature vector and a corresponding auxiliary feature vector; generate at least a first subset of kernels and a second subset of kernels, based on a set of radiance feature vectors and a set of auxiliary feature vectors of the set of pixels; convolute the first subset of kernels with the original image, to generate a first image; and convolute the second subset of kernels with the first image, to generate a second image that has less noise relative to the original image.

Example 16. The system of example 15, wherein to generate a first kernel in the first subset of kernels, the system is to: calculate a first weight that is based on (i) a first L2 norm between a first radiance feature vector of a first pixel and a second radiance feature vector of a second pixel, and (ii) a second L2 norm between a first auxiliary feature vector of the first pixel and a second auxiliary feature vector of the second pixel; and generate the first kernel with a stride having a first number, wherein the first kernel includes the first pixel and the second pixel that are separated by the first number of pixels, and wherein the first kernel includes the first weight.

Example 17. The system of any of examples 15-16, wherein a radiance feature vector of a pixel is representative of one or more of: Red, Green, and Blue (R, G, B) color values of light representing direct illumination and diffuse reflection at a plurality sampling points within the pixel; R, G, B color values of light representing direct illumination and specular reflection at the plurality sampling points within the pixel; R, G, B color values of light representing indirect illumination and diffuse reflection at the plurality sampling points within the pixel; and/or R, G, B color values of light representing indirect illumination and specular reflection at the plurality sampling points within the pixel.

Example 18. A computer program product including one or more non-transitory machine-readable mediums encoded with instructions that when executed by one or more processors cause a process to be carried out for decreasing noise within a digital image, the process comprising: generating, for individual pixels of a set of pixels of the original image, a corresponding radiance feature vector and a corresponding auxiliary feature vector; generating at least a first kernel and a second kernel, based on one or more radiance feature vectors and one or more auxiliary feature vectors; convoluting the first kernel with the original image, to generate a first image; and convoluting the second kernel with the first image, to generate a second image that has less noise relative to the original image.

Example 19. The computer program product of example 18, wherein generating the first kernel comprises: calculating a first weight that is based on (i) a first L2 norm between a first radiance feature vector of a first pixel and a second radiance feature vector of a second pixel, and (ii) a second L2 norm between a first auxiliary feature vector of the first pixel and a second auxiliary feature vector of the second pixel; and generating the first kernel with a stride having a first number, wherein the first kernel includes the first pixel and the second pixel that are separated by the first number of pixels, and wherein the first kernel includes the first weight.

Example 20. The computer program product of example 19, wherein an auxiliary feature vector of a pixel is representative of one or more of: indication of a direction that is perpendicular to a sampling point of the pixel; an albedo feature of the sampling point; a depth of the sampling point relative to a virtual camera taking an image of sampling point; an emissive feature of the sampling point; a metallic feature of the sampling point; a transmissive feature of the sampling point; and/or a roughness features of the sampling point.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for de-noising an image, the method comprising:

identifying, within a first pixel of a first image, a corresponding plurality of sampling points;

for each of the sampling points, estimating a radiance vector characterizing light received at the corresponding sampling point;

for each of the sampling points, estimating an auxiliary vector that includes one or more auxiliary features characterizing a surface of the corresponding sampling point;

generating, by a first machine learning module, an intermediate radiance feature vector for the first pixel, based at least in part on the radiance vectors corresponding to the plurality of sampling points within the first pixel, wherein generating the intermediate radiance feature vector includes averaging sample encoding values generated by a final layer of the first machine learning module;

generating, by a second machine learning module, which is distinct from the first machine learning module, a final radiance feature vector for the first pixel, based at least in part on the intermediate radiance feature vector for the first pixel and one or more intermediate radiance feature vectors for a first set of one or more pixels neighboring the first pixel, wherein the final radiance feature vector has k subsections, and wherein the second machine learning module has a first number of stages;

generating, by the second machine learning module, k scaling factors for the first pixel, each of the k scaling factors associated with a corresponding one of the k subsections of the final radiance feature vector;

generating, by a third machine learning module, which is distinct from the first machine learning module, and for the first pixel, an intermediate auxiliary feature vector, based at least in part on the auxiliary vector;

generating, by a fourth machine learning module, which is distinct from the second and the third machine learning modules, and for the first pixel, a final auxiliary feature vector based at least in part on (a) the intermediate auxiliary feature vector for the first pixel, and (b) one or more intermediate auxiliary feature vectors for a second set of one or more pixels neighboring the first pixel, wherein the fourth machine learning module has a second number of stages that is less than the first number of stages; and generating a second image, based at least in part on the final radiance feature vector, the final auxiliary feature vector, and the k scaling factors, wherein the second image has less noise than the first image.

2. The method of claim 1, wherein:

the final radiance feature vector has at least a corresponding first subsection and a corresponding second subsection; and the method further comprises generating a first subset of kernels having a first stride, based at least in part on the first subsection of the final radiance feature vector, and generating a second subset of kernels having a second stride, based at least in part on the second subsection of the final radiance feature vector.

3. The method of claim 2, wherein generating the first subset of kernels comprises:

generating a first kernel of the first subset of kernels, the first kernel including the first pixel as a target pixel and a plurality of the first set of one or more pixels neighboring the target pixel, wherein the first kernel has a stride of X, indicating that pixels that are X-pixels apart from the target first pixel within the first kernel are assigned non-zero weights, X being a positive integer, a second pixel within the first kernel being X-pixels apart from the target first pixel, and wherein a first weight, which dictates a contribution of radiance value from the second pixel to the first pixel, is calculated based at least in part on a distance between (i) the first subsection of the final radiance feature vector for the first pixel and (ii) a first subsection of a final radiance feature vector for the second pixel.

4. The method of claim 3, further comprising:
generating, by the second machine learning module, for the second pixel, a second pixel scaling factor, wherein generating the first kernel comprises generating the first weight, based at least in part on the second pixel scaling factor; and
generating a second weight for a second kernel, based at least in part on (i) the distance, and (ii) one of the k scaling factors, the second weight dictating a contribution of radiance value from the first pixel to the second pixel;
wherein the first weight is different from the second weight, based at least in part on the one of the k scaling factors being different from the second pixel scaling factor.

5. The method of claim 4, further comprising:
assigning, by the second machine learning module, different values to the one of the k scaling factors and the second pixel scaling factor in response to a detection that the first pixel has a radiance value higher than a threshold, and the second pixel has a radiance value lower than the threshold.

6. The method of claim 2, wherein generating the second image comprises:
convoluting the first subset of kernels with the first image, to generate a first intermediate image;
convoluting the second subset of kernels with the first intermediate image, to generate a second intermediate image; and
convoluting a third subset of kernels with the second intermediate image, to generate the second image.

7. The method of claim 6, wherein:
each kernel in the first subset of kernels has a first stride of 1, such that a plurality of neighboring pixels that are 1-pixel apart from a target pixel in a particular kernel of the first subset of kernels are assigned corresponding non-zero weights;
each kernel in the second subset of kernels has a second stride of 2, such that a plurality of neighboring pixels that are 2-pixels apart from a target pixel in a particular kernel of the second subset of kernels are assigned corresponding non-zero weights; and
each kernel in the third subset of kernels has a third stride of 4, such that a plurality of neighboring pixels that are 4-pixels apart from a target pixel in a particular kernel of the third subset of kernels are assigned corresponding non-zero weights.

8. The method of claim 1, wherein the radiance vector characterizing light received at a first sampling point of the plurality of sampling points comprises one or more of:
Red, Green, and Blue (R, G, B) color values of light representing direct illumination and diffuse reflection at the first sampling point;
R, G, B color values of light representing direct illumination and specular reflection at the first sampling point;
R, G, B color values of light representing indirect illumination and diffuse reflection at the first sampling point; and/or
R, G, B color values of light representing indirect illumination and specular reflection at the first sampling point.

9. The method of claim 1, wherein prior to estimating the radiance vector, the method further comprises:
rendering the first image with Monte Carlo methodology, using a particular quantity of sampling points per pixel.

10. The method of claim 1, further comprising:
generating one or more subsets of kernels based at least in part on the final auxiliary feature vector, wherein the one or more subsets of kernels are usable to generate the second image.

11. The method of claim 10, wherein generating the one or more subsets of kernels comprises:
identifying a second pixel neighboring the first pixel; and
calculating a first weight, based at least in part on (i) a first L2 norm between the final radiance feature vector for the first pixel and a final radiance feature vector for the second pixel, and (ii) a second L2 norm between the final auxiliary feature vector for the first pixel and a final auxiliary feature vector for the second pixel.

12. The method of claim 10, further comprising:
generating a kernel having a stride of X and having the first pixel as a central pixel, such that a plurality of neighboring pixels that are X-pixels apart from the central pixel in the kernel are assigned corresponding non-zero weights, wherein X is a positive integer, wherein the second pixel is X-pixels apart from the central pixel, and wherein the second pixel is assigned the first weight.

13. The method of claim 1, wherein the one or more auxiliary features of a first sampling point comprises one or more of:
coordinates representing a direction that is normal to a surface of the first sampling point;
Red, Green, and Blue (R, G, B) color values representing an albedo feature of the first sampling point;
a depth of the first sampling point relative to a virtual camera capturing the first image;
coordinates representing a position of the first sampling point relative to a coordinate system of the virtual camera; and/or
values representing an emissive property, a metallic property, a transmission property, and/or a roughness property of the first sampling point.

14. A system for rendering a lower noise image from an original image comprising a plurality of pixels, the system comprising:
one or more processors; and
a de-noising system executable by the one or more processors to
identify, within a first pixel of the original image, a plurality of sampling points;
for each of the sampling points, estimate a radiance vector characterizing light received at the corresponding sample point;
for each of the sampling points, estimating an auxiliary vector that includes one or more auxiliary features characterizing a surface of the corresponding sampling point;
generate, by a first machine learning module, an intermediate radiance feature vector for the first pixel based at least in part on the radiance vectors corresponding to the plurality of sampling points within the first pixel, wherein generating the intermediate radiance feature vector includes averaging sample encoding values generated by a final layer of the first machine learning module;
generate, using a second machine learning module, which is distinct from the first machine learning module, a final radiance feature vector for the first pixel and one or more intermediate radiance feature vectors for a first set of one or more pixels neighboring the first pixel, the final radiance feature vector having k subsections, wherein the second machine learning module has a first number of stages;

generate, by the second machine learning module, k scaling factors for the first pixel, each of the k scaling factors associated with a corresponding one of the k subsections of the final radiance feature vector;

generate, using a third machine learning module, which is distinct from the first machine learning module, an intermediate auxiliary feature vector of the first pixel based at least in part on the auxiliary vector;

generate, by a fourth machine learning module, which is distinct from the second and the third machine learning modules, and for the first pixel, a final auxiliary feature vector based at least in part on (a) the intermediate auxiliary feature vector for the first pixel, and (b) one or more intermediate auxiliary feature vectors for a second set of one or more pixels neighboring the first pixel, wherein the fourth machine learning module has a second number of stages that is less than the first number of stages;

generate a first subset of kernels based at least in part on a first subsection of the final radiance feature vector;

generate a second subset of kernels, based at least in part on a second subsection of the final radiance feature vector;

convolute the first subset of kernels with the original image, to generate a first image; and convolute the second subset of kernels with the first image, to generate the lower noise image that has less noise relative to the original image.

15. The system of claim 14, wherein to generate a first kernel in the first subset of kernels, the de-noising system is executable by the one or more processors to:

calculate a first weight that is based on (i) a first L2 norm between the final radiance feature vector of the first pixel and a final radiance feature vector of a second pixel, and (ii) a second L2 norm between the final auxiliary feature vector of the first pixel and a final auxiliary feature vector of the second pixel; and generate the first kernel with a stride having a first number, wherein the first kernel includes the first pixel and the second pixel that are separated by the first number of pixels, and wherein the first kernel includes the first weight.

16. The system of claim 14, wherein the radiance vector comprises one or more of:

Red, Green, and Blue (R, G, B) color values of light representing direct illumination and diffuse reflection at a first one of the plurality of sampling points within the first pixel;

R, G, B color values of light representing direct illumination and specular reflection at the first sampling point;

R, G, B color values of light representing indirect illumination and diffuse reflection at the first sampling point; and/or R, G, B color values of light representing indirect illumination and specular reflection at the first sampling point.

17. A computer program product including one or more non-transitory machine-readable mediums encoded with instructions that when executed by one or more processors cause a process to be carried out for decreasing noise within an original image, the process comprising:

identifying, within a first pixel of the original image, a plurality of sampling points;

for each of the sampling points, estimating a radiance vector characterizing light received at the corresponding sample point;

for each of the sampling points, estimating an auxiliary vector that includes one or more auxiliary features characterizing a surface of the corresponding sampling point;

generating, by a first machine learning module, an intermediate radiance feature vector for the first pixel based at least in part on the radiance vectors corresponding to the plurality of sampling points within the first pixel, wherein generating the intermediate radiance feature vector includes averaging sample encoding values generated by a final layer of the first machine learning module;

generating, using a second machine learning module, which is distinct from the first machine learning module, a final radiance feature vector for the first pixel and one or more intermediate radiance feature vectors for a first set of one or more pixels neighboring the first pixel, the final radiance feature vector having k subsections, wherein the second machine learning module has a first number of stages;

generating, using a third machine learning module, which is distinct from the first machine learning module, an intermediate auxiliary feature vector of the first pixel based at least in part on the auxiliary vector;

generating, by a fourth machine learning module, which is distinct from the second and the third machine learning modules, and for the first pixel, a final auxiliary feature vector based at least in part on (a) the intermediate auxiliary feature vector for the first pixel, and (b) one or more intermediate auxiliary feature vectors for a second set of one or more pixels neighboring the first pixel, wherein the fourth machine learning module has a second number of stages that is less than the first number of stages;

generating a first kernel based at least in part on a first subsection of the final radiance feature vector;

generating a second kernel, based at least in part on a second subsection of the final radiance feature vector;

convoluting the first kernel with the original image, to generate a first image; and convoluting the second kernel with the first image, to generate a second image that has less noise relative to the original image.

18. The computer program product of claim 17, wherein generating the first kernel comprises:

calculating a first weight that is based on (i) a first L2 norm between the final radiance feature vector of the first pixel and a final radiance feature vector of a second pixel, and (ii) a second L2 norm between the final auxiliary feature vector of the first pixel and a final auxiliary feature vector of the second pixel; and generating the first kernel with a stride having a first number, wherein the first kernel includes the first pixel and the second pixel that are separated by the first number of pixels, and wherein the first kernel includes the first weight.

19. The computer program product of claim 17, wherein the one or more auxiliary features corresponding to a particular one of the sampling points is representative of one or more of:

indication of a direction that is perpendicular to the particular one of the sampling points;

an albedo feature of the particular sampling point;

a depth of the particular sampling point relative to a virtual camera taking an image of the particular sampling point;
an emissive feature of the particular sampling point;
a metallic feature of the particular sampling point;
a transmissive feature of the particular sampling point; and/or
a roughness feature of the particular sampling point.

20. The computer program product of claim 17, wherein the process further comprises, before estimating the radiance vector, rendering the original image with Monte Carlo methodology using a particular quantity of sampling points per pixel.

* * * * *